US012763838B2

(12) United States Patent
Ratnam et al.

(10) Patent No.: US 12,763,838 B2
(45) Date of Patent: Oct. 13, 2026

(54) WiFi CSI PREPROCESSING FOR SENSING APPLICATIONS

(71) Applicant: Samsung Electronics Co., Ltd., Suwon-si (KR)

(72) Inventors: Vishnu Vardhan Ratnam, Plano, TX (US); Hao Chen, Allen, TX (US); Abhishek Sehgal, Frisco, TX (US); Hao-Hsuan Chang, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 18/429,209

(22) Filed: Jan. 31, 2024

(65) Prior Publication Data

US 2024/0356616 A1 Oct. 24, 2024

Related U.S. Application Data

(60) Provisional application No. 63/529,311, filed on Jul. 27, 2023, provisional application No. 63/459,888, filed on Apr. 17, 2023.

(51) Int. Cl.
*H04B 7/06* (2006.01)

(52) U.S. Cl.
CPC ......... *H04B 7/0654* (2013.01); *H04B 7/0626* (2013.01)

(58) Field of Classification Search
None
See application file for complete search history.

(56) References Cited

U.S. PATENT DOCUMENTS 9,705,582 B2 * 7/2017 Lee ...................... H04B 7/0413
10,187,133 B2 * 1/2019 Forenza ............... H04B 7/0617
(Continued)

FOREIGN PATENT DOCUMENTS

CN 114785435 B 7/2022
CN 114140964 B 8/2023
(Continued)

OTHER PUBLICATIONS

Chen et al., "Tr-breath: Time-reversal breathing rate estimation and detection," IEEE Transactions on Biomedical Engineering, vol. 65, No. 3, 2018, 14 pages.
(Continued)

*Primary Examiner* — Faiyazkhan Ghafoerkhan

(57) ABSTRACT

Methods and apparatuses for WiFi CSI preprocessing for sensing applications are provided. A method of wireless communication performed by a STA comprises: receiving a sequence of frames; obtaining a CSI set, comprising the CSI for each of the frames; determining one or more variations in the CSI set caused by at least one of a device impairment, a synchronization issue, or an unintended signal; performing a preprocessing procedure configured to: correct one or more errors in gain and phase of each CSI of the CSI set caused by at least one of the device impairment or the synchronization issue, and filter at least one variation caused by the unintended signal; and identifying at least one of an outlier or a variation in CSI set that affects a sensing task, and performing at least one preprocessing operation configured to filter the outlier or the variation in CSI set.

20 Claims, 13 Drawing Sheets

(56) References Cited

U.S. PATENT DOCUMENTS

| | | | | |
|---|---|---|---|---|
| 11,616,553 B1 * | 3/2023 | Kachroo | H04L 5/0062 375/262 |
| 11,616,663 B2 * | 3/2023 | Wang | H04W 24/08 455/67.11 |
| 11,953,618 B2 * | 4/2024 | Regani | G01S 13/86 |
| 12,302,173 B2 * | 5/2025 | Guchhait | H04W 28/24 |
| 2005/0105657 A1 * | 5/2005 | Kroeger | H04B 7/0805 375/347 |
| 2011/0002410 A1 * | 1/2011 | Forenza | H04B 7/0617 375/267 |
| 2017/0041905 A1 * | 2/2017 | Chen | H04W 72/23 |
| 2017/0331670 A1 * | 11/2017 | Parkvall | H04W 52/0229 |
| 2019/0098497 A1 * | 3/2019 | Shapira | H04L 9/0875 |
| 2020/0028745 A1 * | 1/2020 | Parkvall | H04J 11/0079 |
| 2021/0022619 A1 * | 1/2021 | Ho | A61B 5/0507 |
| 2021/0173046 A1 * | 6/2021 | Regani | G01S 13/44 |
| 2021/0266054 A1 * | 8/2021 | Yu | H04B 7/063 |
| 2022/0304051 A1 * | 9/2022 | Aboul-Magd | H04B 7/0626 |
| 2023/0109947 A1 * | 4/2023 | Parkvall | H04J 11/0079 455/418 |
| 2023/0180113 A1 * | 6/2023 | Beg | H04L 25/0204 370/338 |
| 2023/0199702 A1 * | 6/2023 | Johnsson | G01S 7/415 455/456.1 |
| 2024/0187085 A1 * | 6/2024 | Mcmenamy | H04B 7/15557 |
| 2024/0356616 A1 * | 10/2024 | Ratnam | H04B 7/0654 |

FOREIGN PATENT DOCUMENTS

| | | |
|---|---|---|
| EP | 2130345 B1 | 6/2013 |
| EP | 2484141 B1 | 4/2020 |
| KR | 20210082512 A | 7/2021 |
| KR | 10-2021-0104939 A | 8/2021 |
| KR | 10-2387736 B1 | 4/2022 |

OTHER PUBLICATIONS

Liu et al., "Wiphone: Smartphone-based respiration monitoring using ambient reflected WiFi signals," Proceedings of the ACM on Interactive, Mobile, Wearable and Ubiquitous Technologies, vol. 5, No. 1, 2021, 20 pages.

Dou et al., "Full respiration rate monitoring exploiting doppler information with commodity Wi-Fi devices," Sensors, vol. 21, No. 10, 2021, 22 pages.

"Draft standard for information technology-telecommunications and information exchange between systems local and metropolitan area networks-specific requirements—Part 11: Wireless LAN medium access control (MAC) and physical layer (PHY) specifications," IEEE Std 802.11-2020 (Revision of IEEE Std 802.11-az/D5.0), 2022, 287 pages.

Jiang, et al., "Smart Home based on WiFi Sensing: A Survey", IEEE Access, vol. 6., 2018, 10 Pages.

Ma et al., "WiFi Sensing with Channel State Information: A Survey", ACM Comput. Surv., vol. 52, No. 3, Article 46, 2019, 36 pages.

Fang et al., "A Novel Sleep Respiratory Rate Detection Method for Obstructive Sleep Apnea Based on Characteristic Moment Waveform", Journal of Healthcare Engineering, vol. 2018, Article ID 1902176, 2018, 10 Pages.

Charlton et al., "Breathing Rate Estimation From the Electrocardiogram and Photoplethysmogram: A Review", IEEE Reviews in Biomedical Engineering, vol. 11, pp. 2-20, 2018, 19 pages.

Regev et al., "Radar-Based, Simultaneous Human Presence Detection and Breathing Rate Estimation" Sensors, vol. 21, No. 10, 2021, 16 pages.

Natarajan et al., "Measurement of respiratory rate using wearable devices and applications to COVID-19 detection", npj Digital Medicine, vol. 4, 2021, 10 Pages.

Patwari et al., "Breathfinding: A Wireless Network That Monitors and Locates Breathing in a Home", IEEE Journal of Selected Topics in Signal Processing, vol. 8, No. 1, 2014, 14 pages.

Abdelnasser et al., "UbiBreathe: A Ubiquitous non-Invasive WiFi-based Breathing Estimator", In Proceedings of the 16th ACM International Symposium on Mobile Ad Hoc Networking and Computing (MobiHoc '15), Association for Computing Machinery, New York, NY, USA, 2015, 10 Pages.

Liu et al., "Wi-Sleep: Contactless Sleep Monitoring via WiFi Signals," 2014 IEEE Real-Time Systems Symposium, Rome, Italy, pp. 346-355, 2014, 10 Pages.

Liu et al., "Tracking Vital Signs During Sleep Leveraging Off-the-shelf WiFi", In Proceedings of the 16th ACM International Symposium on Mobile Ad Hoc Networking and Computing (MobiHoc '15), Association for Computing Machinery, New York, NY, USA, pp. 267-276, 2015, 10 pages.

Wang et al., "TensorBeat: Tensor Decomposition for Monitoring Multiperson Breathing Beats with Commodity WiFi", ACM Transactions on Intelligent Systems and Technology, vol. 9, No. 1, Article No. 8, 2017, 27 pages.

Zeng et al., "FullBreathe: Full Human Respiration Detection Exploiting Complementarity of CSI Phase and Amplitude of WiFi Signals", Proceedings of the ACM on Interactive, Mobile, Wearable and Ubiquitous Technologies, vol. 0, No. 0, Article 39, pp. 1-19, 2018, 19 pages.

Niu et al., "WiMonitor: Continuous Long-Term Human Vitality Monitoring Using Commodity Wi-Fi Devices", Sensors, vol. 21, No. 3, 2021, 28 pages.

Zeng et al., "FarSense: Pushing the Range Limit of WiFi-based Respiration Sensing with CSI Ratio of Two Antennas", Proceedings of the ACM on Interactive, Mobile, Wearable and Ubiquitous Technologies, vol. 3, No. 3, Article 121, 2019, 26 pages.

Xie et al., "Precise Power Delay Profiling with Commodity Wi-Fi", IEEE Transactions on Mobile Computing, vol. 18, No. 6, 2019, 12 pages.

Schmidl et al., "Robust frequency and timing synchronization for OFDM", IEEE Transactions on Communications, vol. 45, No. 12, 1997, 9 pages.

Nasir et al., "Timing and carrier synchronization in wireless communication systems: a survey and classification of research in the last 5 years", Eurasip Journal on Wireless Communications and Networking, vol. 2016, Article 180, 2016, 38 pages.

Sourour et al., "Frequency offset estimation and correction in the IEEE 802.11a WLAN", IEEE 60th Vehicular Technology Conference, vol. 7, pp. 4923-4927, 2004, 6 pages.

Petrovic et al., "Effects of Phase Noise on OFDM Systems With and Without PLL: Characterization and Compensation", IEEE Transactions on Communications, vol. 55, No. 8, pp. 1607-1616, 2007, 10 pages.

Ratnam, Vishnu V., "Performance of Analog Beamforming Systems With Optimized Phase Noise Compensation", IEEE Transactions on Signal Processing, vol. 68, pp. 5334-5348, 2020, 15 pages.

Lee et al., "Efficient automatic gain control algorithm and architecture for wireless LAN receivers", Journal of Systems Architecture, vol. 53, Issue 7, pp. 379-385, 2007, 4 pages.

Cheng et al., "Fast-Settling Feedforward Automatic Gain Control Based on a New Gain Control Approach", IEEE Transactions on Circuits and Systems II: Express Briefs, vol. 61, No. 9, pp. 651-655, 2014, 5 pages.

Jang et al., "A Fast Automatic Gain Control Scheme for 3GPP LTE TDD System", IEEE 72nd Vehicular Technology Conference—Fall, pp. 1-5, 2010, 5 pages.

Jin et al., "Performances of Various AGC Algorithms for IEEE802.11p WAVE", Journal of IKEEE, vol. 18, No. 4, pp. 502-508, 2014, 7 pages.

Ester et al., "A density-based algorithm for discovering clusters in large spatial databases with noise", In Proceedings of the Second International Conference on Knowledge Discovery and Data Mining (KDD-96), AAAI Press, pp. 226-231, 1996, 6 pages.

"IEEE standard for information technology-telecommunications and information exchange between systems local and metropolitan area networks-specific requirements—Part 11: Wireless LAN medium access control (MAC) and physical layer (PHY) specifications," IEEE Std 802.Nov. 2020 (Revision of IEEE Std 802.11-2016), 2020, 4379 pages.

(56) References Cited

OTHER PUBLICATIONS

International Search Report and Written Opinion issued May 27, 2024 regarding International Application No. PCT/KR2024/002176, 6 pages.
Beijing Jiaotong University, “Evaluation of CSI compression with AI/ML”, 3GPP TSG RAN WG1 #109-e, R1-2204055, May 2022, 7 pages.
Supplementary European Search Report dated Apr. 20, 2026, in connection with European Patent Application No. 24792811.2, 9 pages.

* cited by examiner

An illustration of CSI angle before phase correction $\angle\tilde{h}_{p,k}$

An illustration of CSI angle after phase correction $\angle\hat{h}_{p,k}$

WiFi CSI PREPROCESSING FOR SENSING APPLICATIONS

CROSS-REFERENCE TO RELATED APPLICATION(S) AND CLAIM OF PRIORITY

This application claims priority under 35 U.S.C. § 119(e) to U.S. Provisional Patent Application No. 63/459,888 filed on Apr. 17, 2023, and U.S. Provisional Patent Application No. 63/529,311 filed on Jul. 27, 2023, which are hereby incorporated by reference in their entirety.

TECHNICAL FIELD

This disclosure relates generally to the use of WiFi infrastructure for performing sensing tasks in wireless communications systems. Embodiments of this disclosure relate to methods and apparatuses for wireless fidelity (WiFi) channel state information (CSI) preprocessing for sensing applications.

BACKGROUND

Wireless local area network (WLAN) technology allows devices to access the internet in the 2.4 GHZ, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

With the advent of the internet-of-things and ubiquitous availability of WiFi infrastructure (access points and stations), WiFi-based wireless sensing has become an increasingly important topic. In wireless sensing, a transmitter (TX) periodically transmits a known signal, and a receiver (RX) uses the received signal to track temporal variations in the channel, and correspondingly, in the ambient environment. This has many applications including presence detection, exercise monitoring, people counting, intruder alarm, respiration rate detection, and sleep monitoring [3]-[6].

One difficulty of WiFi devices is that the TX and RX do not have timing and carrier synchronization, due to which the channel estimate at the RX, referred to as channel state information (CSI), suffers from random phase errors. In addition, the impact of variable gain circuits in the RX causes random amplitude fluctuations in the channel estimate at the RX. Because these gain and phase errors are not easily separable from the variations in the "true" channel (which captures environment variations relevant to sensing), wireless sensing using WiFi devices has proven to be very challenging. Several approaches have been used to address these errors:

1. To account for gain errors, various types of solutions include: (i) use of CSI metrics that are robust to gain errors, and (ii) explicitly estimating the gain error to recover the clean CSI. Among methods of type (i), some use only the received signal strength indicator (RSSI) at an RX, corresponding to signals transmitted from a WiFi TX, to perform sensing [7], [8]. Other methods use a Hampel filter based outlier removal and interpolation to remove the impact of the gain error [9], [10]. In one solution, the received CSI is normalized to get rid of the gain error [11]. In another solution, only the phase information of CSI is used for estimation [12]. A Savitzky Golay filter is used in other solutions to reduce the impact of gain variations on CSI [13], [14]. In another solution, a dBScan based clustering algorithm is proposed to identify and filter CSI values belonging to different discrete gain levels [15]. Among methods of type (ii), one solution proposes a method to use side information such as RSSI and gain coefficient information to estimate the CSI gain [16]. However, this method requires prior calibration of the WiFi chip to learn the mapping.
2. To account for phase-errors, various types of solutions include: (i) use of CSI metrics that are robust to phase-errors and (ii) explicitly estimating the phase-errors to recover clean CSI. Among methods of type (i), some use only the received signal strength at an RX, corresponding to signals transmitted from a WiFi TX, to perform sensing [7], [8]. In other solutions, only the WiFi CSI amplitude from different sub-carriers is utilized for sensing [9], [10]. Using the principle that the phase errors affect the CSI at all receive antennas similarly, another solution uses only the phase difference in the channel CSI at two receive antennas for performing sensing [12]. Using the same principle, yet another solution uses the ratio of the CSI observed at two antennas to perform sensing [17]. In one solution, a combination of the CSI amplitude and the CSI phase-difference between two receive antennas are jointly utilized for the sensing [13]. In another solution, both the amplitude and phase of channel CSI were fully exploited, wherein a time reversal resonating strength metric is computed for the channel CSI, which is then used for sensing [11]. In one solution, the power delay profile corresponding to the CSI is used for sensing, after estimating and removing the phase errors due to timing offset [18]. Among methods of type (ii), one solution proposes a least-squares method for estimating and correcting the CSI phase errors [14].

For either of gain or phase error correction, methods of type (i) do not utilize the full information encoded in CSI and typically use some non-linear metrics of CSI, which can make the sensing operation complicated. Many of these methods also have restrictions, such as requiring at least two receive antennas. In comparison, methods of type (ii) maintain a linear relationship with the input CSI and can potentially exploit the full information encoded in both the amplitude and phase of CSI. However, the existing methods of type (ii) are heuristic, and do not exploit the structure present in the CSI. Furthermore, although performance of these multiple methods has been studied for some specific sensing tasks, a comparative study of how well they can replicate the clean CSI has not been undertaken. Finally, due to interference from other non-sensing sources, the received CSI can have variations that can be either slow changes or abrupt changes. These variations can cause strong interference to the sensing signal thus degrading the performance of a sensing algorithm.

SUMMARY

Embodiments of the present disclosure provide methods and apparatuses for WiFi CSI preprocessing for sensing applications.

In one embodiment, a method of wireless communication performed by a station (STA) is provided, the method comprising: receiving a sequence of frames; obtaining a channel state information (CSI) set, comprising the CSI for each of the frames; determining one or more variations in the CSI set caused by at least one of a device impairment, a synchronization issue, or an unintended signal; performing a preprocessing procedure configured to: correct one or more errors in gain and phase of each CSI of the CSI set caused by at least one of the device impairment or the synchronization issue, and filter at least one variation caused by the unintended signal; and identifying at least one of an outlier or a variation in CSI set that affects a sensing task, and performing at least one preprocessing operation configured to filter the outlier or the variation in CSI set.

In another embodiment, a STA is provided, comprising a transceiver and a processor operably coupled to the transceiver. The transceiver is configured to: receive a sequence of frames; and obtain a CSI set, comprising the CSI for each of the frames. The processor is configured to: determine one or more variations in the CSI set caused by at least one of a device impairment, a synchronization issue, or an unintended signal; perform a preprocessing procedure configured to: correct one or more errors in gain and phase of each CSI of the CSI set caused by at least one of the device impairment or the synchronization issue, and filter at least one variation caused by the unintended signal; and identify at least one of an outlier or a variation in CSI set that affects a sensing task, and performing at least one preprocessing operation configured to filter the outlier or the variation in CSI set.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
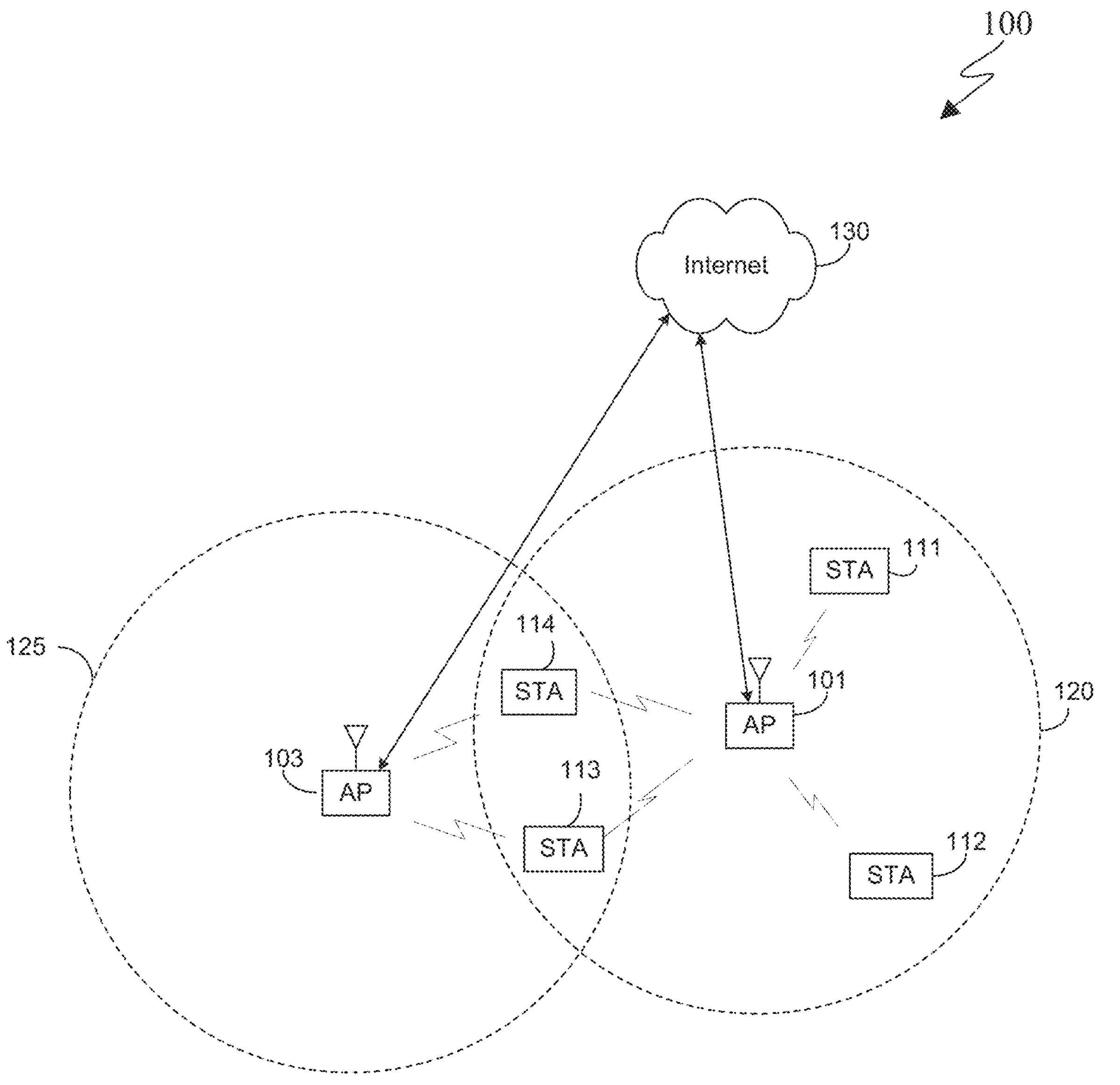
FIG. 1 illustrates an example wireless network according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: [1] H. Jiang, C. Cai, X. Ma, Y. Yang, and J. Liu, "Smart Home Based on WiFi Sensing: A survey," IEEE Access, vol. 6, pp. 13317-13325, 2018; [2] Y. Ma, G. Zhou, and S. Wang, "WiFi Sensing with Channel State Information: A Survey," ACM Comput. Surv., vol. 52, June 2019; [3] Y. Fang, Z. Jiang, and H. Wang, "A Novel Sleep Respiratory Rate Detection Method for Obstructive Sleep Apnea Based on Characteristic Moment Waveform," Journal of Healthcare Engineering, vol. 2018, 2018; [4] P. H. Charlton, D. A. Birrenkott, T. Bonnici, M. A. F. Pimentel, A. E. W. Johnson, J. Alastruey, L. Tarassenko, P. J. Watkinson, R. Beale, and D. A. Clifton, "Breathing Rate Estimation From the Electrocardiogram and Photoplethysmogram: A Review," IEEE Reviews in Biomedical Engineering, vol. 11, pp. 2-20, 2018; [5] N. Regev and D. Wulich, "Radar-Based, Simultaneous Human Presence Detection and Breathing Rate Estimation," Sensors, vol. 21, no. 10, 2021; [6] A. Natarajan, H.-W. Su, C. Heneghan, L. Blunt, C. O'Connor, and L. Niehaus, "Measurement of Respiratory Rate Using Wearable Devices and Applications to Covid-19 Detection," NPJ Digital Medicine, vol. 4, 2021; [7] N. Patwari, L. Brewer, Q. Tate, O. Kaltiokallio, and M. Bocca, "Breathfinding: A Wireless Network That Monitors and Locates Breathing in a Home," IEEE Journal of Selected Topics in Signal Processing, vol. 8, no. 1, pp. 30-42, 2014; [8] H. Abdelnasser, K. A. Harras, and M. Youssef, "UbiBreathe," in Proceedings of the 16th ACM International Symposium on Mobile Ad Hoc Networking and Computing, ACM, June 2015; [9] X. Liu, J. Cao, S. Tang, and J. Wen, "Wi-Sleep: Contactless Sleep Monitoring Via WiFi Signals," in 2014 IEEE Real-Time Systems Symposium, pp. 346-355, 2014; J. Liu, Y. Wang, Y. Chen, J. Yang, X. Chen, and J. Cheng, "Tracking Vital Signs During Sleep Leveraging off-the-shelf WiFi," in Proceedings of the 16th ACM International Symposium on Mobile Ad Hoc Networking and Computing, MobiHoc '15, (New York, NY, USA), p. 267-276, Association for Computing Machinery, 2015; C. Chen, Y. Han, Y. Chen, H.-Q. Lai, F. Zhang, B. Wang, and K. J. R. Liu, "Tr-breath: Time-Reversal Breathing Rate Estimation and Detection," IEEE Transactions on Biomedical Engineering, vol. 65, no. 3, pp. 489-501, 2018; X. Wang, C. Yang, and S. Mao, "Tensorbeat: Tensor Decomposition for Monitoring Multiperson Breathing Beats with Commodity WiFi," ACM Trans. Intell. Syst. Technol., vol. 9, September 2017; Y. Zeng, D. Wu, R. Gao, T. Gu, and D. Zhang, "Fullbreathe: Full Human Respiration Detection Exploiting Complementarity of CSI Phase and Amplitude of WiFi Signals," Proceedings of the ACM on Interactive, Mobile, Wearable and Ubiquitous Technologies, vol. 2, pp. 1-19, 09 2018; C. Dou and H. Huan, "Full Respiration Rate Monitoring Exploiting Doppler Information with Commodity WiFiDdevices," Sensors, vol. 21, no. 10, 2021; J. Liu, Y. Zeng, T. Gu, L. Wang, and D. Zhang, "Wiphone: Smartphone-based Respiration Monitoring Using Ambient Reflected WiFi Signals," Proc. ACM Interact. Mob. Wearable Ubiquitous Technol., vol. 5, March 2021; X. Niu, S. Li, Y. Zhang, Z. Liu, D. Wu, R. C. Shah, C. Tanriover, H. Lu, and D. Zhang, "Wimonitor: Continuous Long-term Human Vitality Monitoring Using Commodity WiFi Devices," Sensors, vol. 21, no. 3, 2021; Y. Zeng, D. Wu, J. Xiong, E. Yi, R. Gao, and D. Zhang, "Farsense: Pushing the Range Limit of WiFi-based Respiration Sensing with CSI Ratio of Two Antennas," Proc. ACM Interact. Mob. Wearable Ubiquitous Technol., vol. 3, September 2019; Y. Xie, Z. Li, and M. Li, "Precise Power Delay Profiling with Commodity WiFi," IEEE Transactions on Mobile Computing, vol. 18, no. 6, pp. 1342-1355, 2019; "IEEE Standard for Information Technology-telecommunications and Information Exchange Between Systems-Local and Metropolitan Area Networks-specific Requirements-part 11: Wireless LAN Medium Access Control (MAC) and Physical Layer (PHY) Specifications," IEEE Std 802.11-2020 (Revision of IEEE Std 802.11-2016), pp. 1-4379, 2021; T. M. Schmidl and D. C. Cox, "Robust Frequency and Timing Synchronization for OFDM," IEEE Transactions on Communications, vol. 45, pp. 1613-1621 December 1997; A. A. Nasir, S. Durrani, H. Mehrpouyan, S. D. Blostein, and R. A. Kennedy, "Timing and Carrier Synchronization in Wireless Communication: a Survey and Classification of Research in the last 5 years," EURASIP Journal on Wireless Communications and Networking, vol. 2016, p. 180, August 2016; E. Sourour, H. El-Ghoroury, and D. McNeill, "Frequency Offset Estimation and Correction in the IEEE 802.11a WLAN," in IEEE Vehicular Technology Conference (VTC), vol. 7, pp. 4923-4927 Vol. 7, 2004; D. Petrovic, W. Rave, and G. Fettweis, "Effects of Phase Noise on OFDM Systems with and Without PLL: Characterization and Compensation," IEEE Transactions on Communications, vol. 55, pp. 1607-1616 Aug. 2007; V. V. Ratnam, "Performance of Analog Beamforming Systems with Optimized Phase Noise Compensation," IEEE Transactions on Signal Processing, vol. 68, pp. 5334-5348, 2020; I.-G. Lee and S.-K. Lee, "Efficient Automatic Gain Control Algorithm and Architecture for Wireless LAN Receivers," Journal of Systems Architecture, vol. 53, pp. 379-385, 07 2007; X. Cheng, G. Xie, Z. Zhang, and Y. Yang, "Fast-settling Feedforward Automatic Gain Control Based on a New Gain Control Approach," IEEE Transactions on Circuits and Systems II: Express Briefs, vol. 61, no. 9, pp. 651-655, 2014; J. H. Jang and H. J. Choi, "A Fast Automatic Gain Control Scheme for 3GPP LTE TDD System," in IEEE Vehicular Technology Conference-Fall, pp. 1-5, 2010; S.-K. Jin, S.-H. Yoon, and S. Dae-Kyo, "Performances of Various AGC Algorithms for IEEE802.11p WAVE," Journal of IKEEE, vol. 18, no. 4, pp. 502-508, 2014; M. Ester, H.-P. Kriegel, J. Sander, and X. Xu, "A Density-based Algorithm for Discovering Clusters in Large Spatial Databases with Noise," in Proc. of International Conference on Knowledge Discovery and Data Mining, pp. 226-231, AAAI Press, 1996; The Multivariate Normal and Related Distributions, ch. 1, pp. 1-49. John Wiley & Sons, Ltd, 1982; K. Mardia and P. Jupp, Directional Statistics. Wiley Series in Probability and Statistics, Wiley, 1999; "Draft Standard for Information Technology-telecommunications and Information Exchange Between Systems-Local and Metropolitan Area Networks-specific Requirements-part 11: Wireless LAN Medium Access Control (MAC) and Physical Layer (PHY) Specifications," IEEE Std 802.11-2020 (Revision of IEEE Std 802.11-az/D5.0), pp. 1-287, 2022.

Embodiments of the present disclosure recognize that due to its ubiquitous and contact-free nature, the use of WiFi infrastructure for performing sensing tasks has tremendous potential. This has many applications including presence detection, exercise monitoring, people counting, intruder alarm, respiration rate detection, and sleep monitoring. However, due to lack of synchronization between the WiFi transmitter and receiver, the channel state information (CSI) measured by WiFi devices suffers from errors in both its gain and phase, which can significantly hinder sensing tasks. In addition, hardware impairments and unintended interference signals also cause variations in the CSI which can impact sensing. Thus, improved CSI pre-processing methods to remove such errors at the RX to obtain clean CSI that can then be fed to an appropriate sensing algorithm would be beneficial.

Embodiments of the present disclosure provide several preprocessing methods to clean the channel state information (CSI) obtained from commodity WiFi infrastructure. By analyzing these errors from different WiFi devices, a mathematical model has been developed for the gain and phase errors in WiFi CSI. Based on this model, several preprocessing algorithms for correcting such errors and obtaining clean CSI are provided.

In addition, embodiments of the present disclosure provide solutions to reduce the impact of CSI variations due to transceiver impairments and unintended signals and for identifying and removing outliers in the CSI data.

Further, embodiments of the present disclosure provide a mathematical model to represent the variation in WiFi CSI caused by device impairments, synchronization issues and unintended signals, and validating the model using real-world measurements. Further, embodiments of the present disclosure perform at least one preprocessing algorithm for correcting the errors in gain and phase of CSI caused by device impairments and synchronization issues. In addition, embodiments of the present disclosure identify variations in the CSI data that can significantly hamper a sensing task and perform at least one preprocessing operation to perform effective "background cancellation" of such variation, and identify outliers and perform at least one preprocessing operation for filtering such data.

For simplicity, embodiments of the present disclosure discuss WiFi CSI preprocessing for sensing applications as performed by a STA (i.e., a non-AP STA), however it is understood that an AP (i.e., an AP STA) can also perform WiFi CSI preprocessing for sensing applications. It is also understood that non-AP STAs and AP STAs are both IEEE 802.11 node devices (or nodes), which may also be referred to as WI-FI node devices (or nodes). Accordingly, discussion herein below of actions performed by a STA may be performed by any appropriate IEEE 802.11 node.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating WiFi CSI preprocessing for sensing applications. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
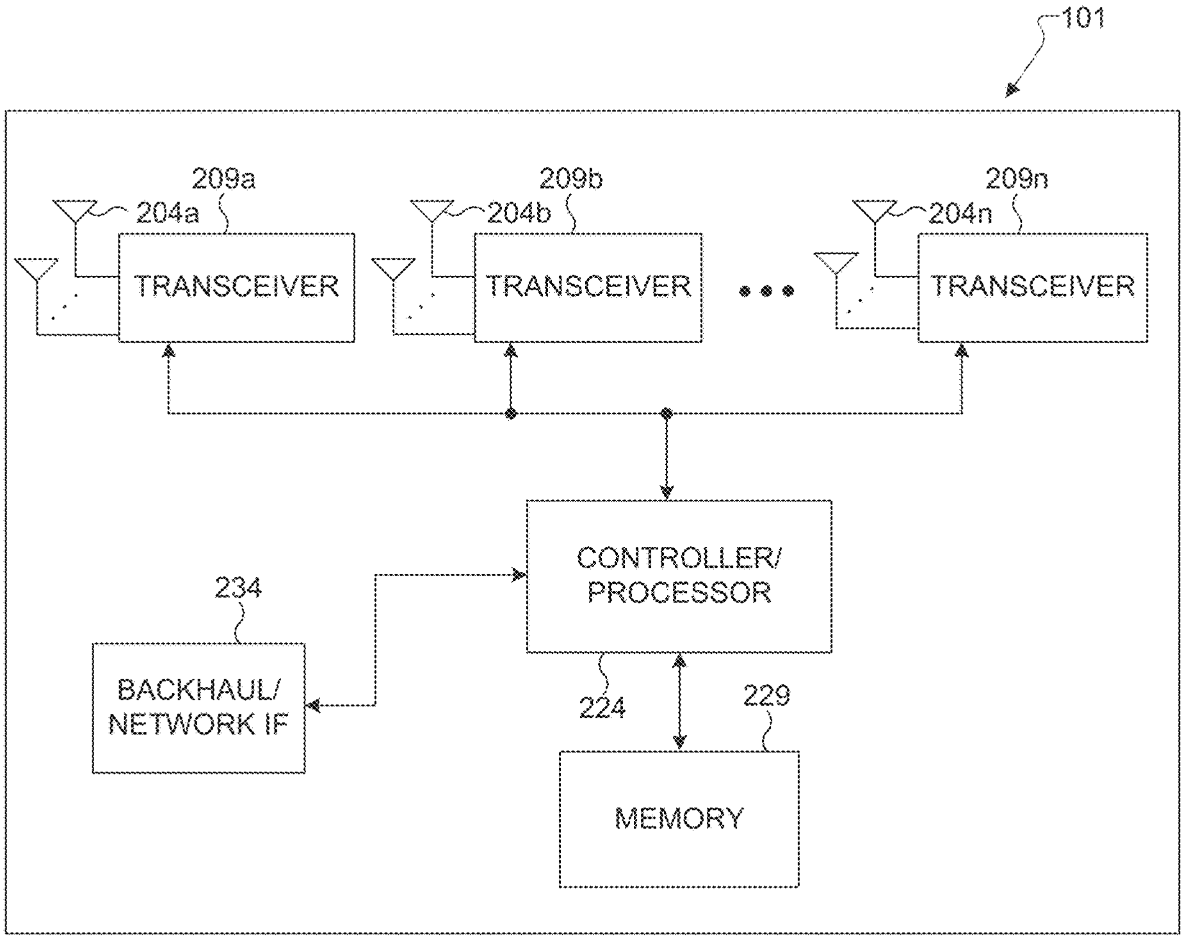
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support orthogonal frequency-division multiple access (OFDMA) operations in which outgoing signals are assigned to different subsets of subcarriers for different recipients (e.g., different STAs 111-114). Any of a wide variety of other functions could be supported in the AP 101 by the controller/processor 224 including facilitating WiFi CSI preprocessing for sensing applications OBSS PD threshold adaptation based on environmental context and feedback. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating WiFi CSI preprocessing for sensing applications OBSS PD threshold adaptation based on environmental context and feedback. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
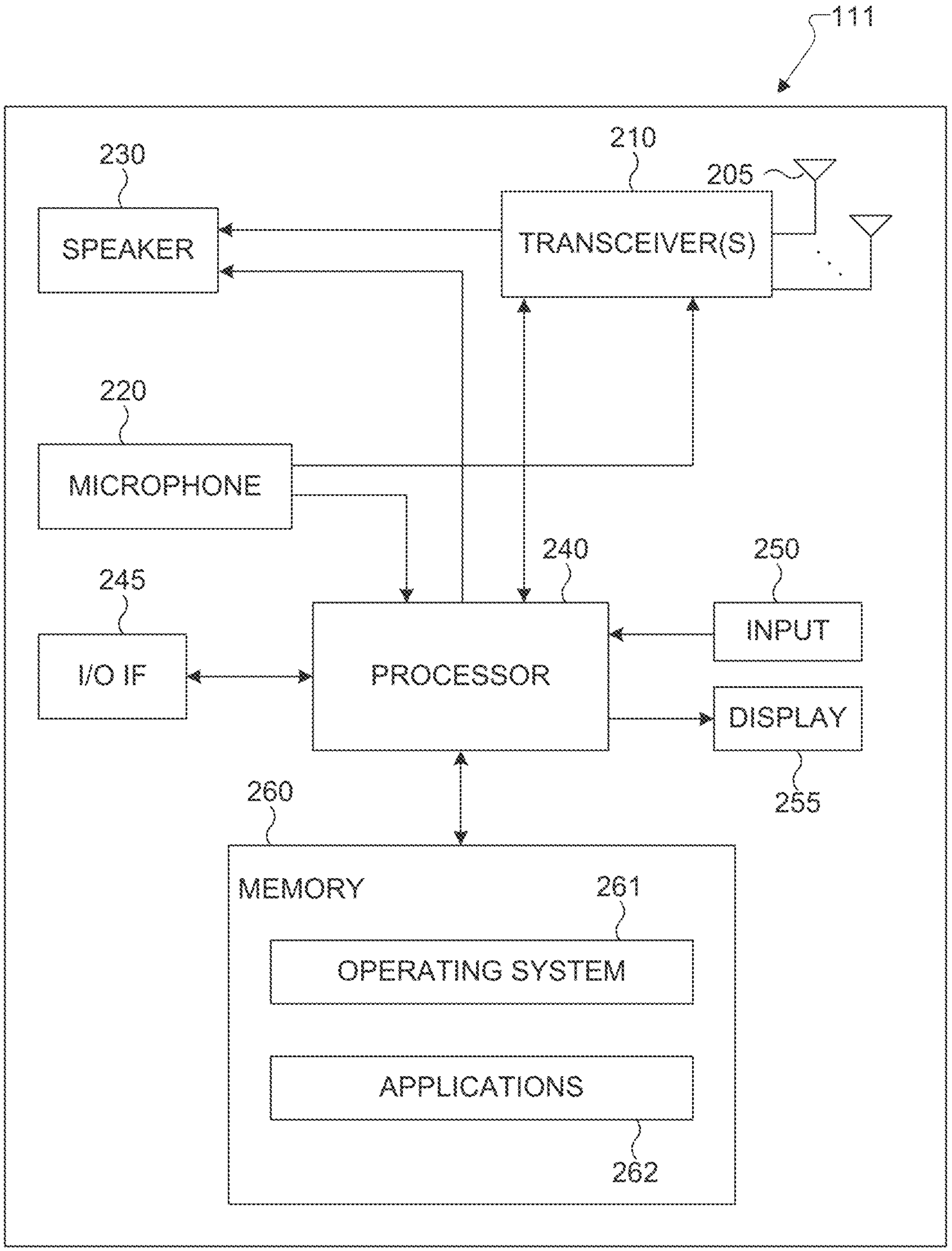
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver(s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate WiFi CSI preprocessing for sensing applications OBSS PD threshold adaptation based on environmental context and feedback. In some embodiments, the processor 240 includes at least one microprocessor or microcontroller.

The processor 240 is also capable of executing other processes and programs resident in the memory 260, such as operations for facilitating WiFi CSI preprocessing for sensing applications. The processor 240 can move data into or out of the memory 260 as required by an executing process. In some embodiments, the processor 240 is configured to execute a plurality of applications 262, such as applications for facilitating WiFi CSI preprocessing for sensing applications OBSS PD threshold adaptation based on environmental context and feedback. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
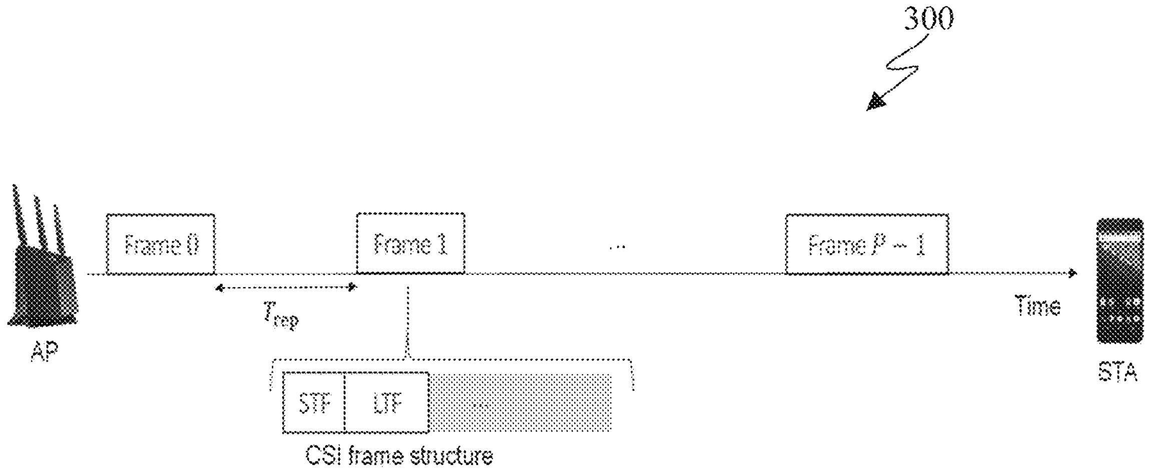
FIG. 3 illustrates an example system model depicting a WiFi access point, a WiFi station and CSI acquisition frame structure according to various embodiments of the present disclosure.

FIG. 3 illustrates an example system model 300 depicting a WiFi access point, a WiFi station and CSI acquisition frame structure according to various embodiments of the present disclosure. The embodiment of the example system model 300 depicting a WiFi access point, a WiFi station and CSI acquisition frame structure shown in FIG. 3 is for illustration only. Other embodiments of the example system model 300 depicting a WiFi access point, a WiFi station and CSI acquisition frame structure could be used without departing from the scope of this disclosure.

As illustrated in FIG. 3, the system 300 has a stationary WiFi access point as the TX and a WiFi station as the RX. Although a single TX and RX antenna is illustrated for simplicity, one skilled in the art will appreciate that the results are also applicable to multiple antennas by repeating the preprocessing methods for CSI for each TX-RX antenna pair. To enable sensing of variations in the environment, the TX may transmit a sequence of WiFi CSI acquisition frames. Such a frame can be, for example, null data packets that are transmitted periodically at an interval of $T_{rep}$ seconds each. For convenience, each CSI frame is indexed using a natural number, i.e., the p-th CSI frame transmitted by the TX is indexed as p. The header and the payload of these CSI frames can be encoded using orthogonal frequency division multiplexing (OFDM) over K sub-carriers indexed as: $\mathcal{K}=\{0, \ldots, K-1\}$ with a symbol duration of $T_s$, and may be transmitted at a carrier frequency $f_c$. The header of the CSI acquisition frame may include one legacy short training field (L-STF) and one legacy long training field (L-LTF), each of size one OFDM symbol. Each transmitted CSI frame passes through a time-varying channel before reaching the RX.

Let $h_{p,k}$ be the true frequency-domain channel (that captures the variation to be sensed) between the TX and RX on sub-carrier k for CSI frame p. In one embodiment, $h_{p,k}$ is modeled as:

$$h_{p,k} = b_k + d_{p,k},$$

where $b_k$ is the static component of CSI that includes the line-of-sight path, reflected from static objects like walls and $d_{p,k}$ is the dynamic component of CSI that is time varying and includes the variation to be sensed by the sensing algorithm. Using the received signal for each CSI frame p, the RX may obtain the noisy channel estimate (also called CSI) on sub-carrier k as $\tilde{h}_{p,k}$. This noisy CSI can be modeled as:

$$\tilde{h}_{p,k} = g_p h_{p,k} e^{-j2\pi f_k \tau_p} e^{-j\psi_p},$$

where $g_p$ is the gain error in the noisy CSI, $j=\sqrt{-1}$, $f_k=k/T_s$ is the frequency-offset of the k-th subcarrier, $\tau_p$ is the error in symbol start time detection at the RX (referred to here as timing error), and $\psi_p$ is the common phase error (CPE) of the RX carrier with respect to the TX carrier at the time of reception of the p-th CSI acquisition frame. Note that $g_p$, $\tau_p$, $\psi_p$ distort the gain and phase of the received CSI making the sensing task difficult.

Figure 4:
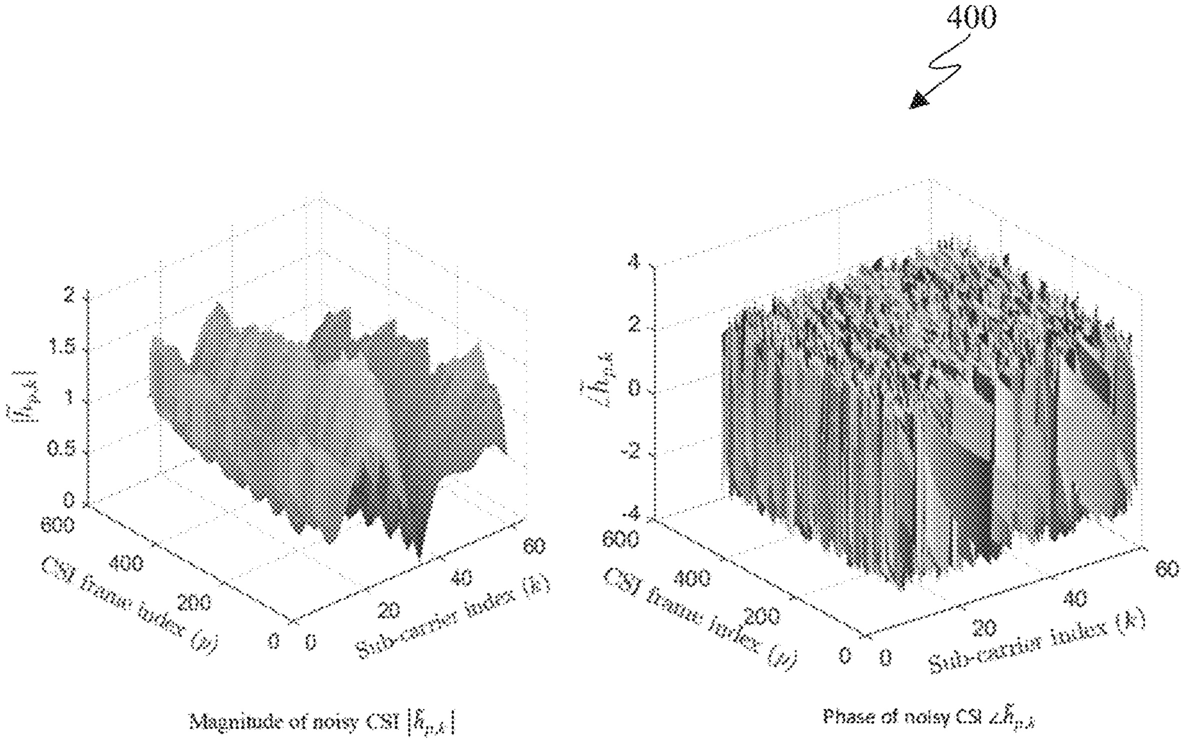
FIG. 4 illustrates an example of noisy CSI according to various embodiments of the present disclosure.

FIG. 4 illustrates an example of noisy CSI 400 according to various embodiments of the present disclosure. The embodiment of the example of noisy CSI 400 shown in FIG. 4 is for illustration only. Other embodiments of the example of noisy CSI 400 could be used without departing from the scope of this disclosure. The embodiment of the noisy CSI 400 includes the magnitude of the noisy CSI and the phase of the noisy CSI.

The present disclosure provides embodiments to obtain estimates $\hat{g}_p$, $\hat{\tau}_p$, $\hat{\psi}_p$ of $g_p$, $\tau_p$, $\psi_p$ so that the clean preprocessed CSI can be obtained as:

$$\hat{h}_{p,k} = \tilde{h}_{p,k} e^{j2\pi f_k \hat{\tau}_p} e^{j\hat{\psi}_p} / \hat{g}_p.$$

In some embodiments, the RX first accumulates the CSI for P CSI acquisition frames $\{\tilde{h}_{p,k} | 0 \le p < P\}$, and then uses them to estimate $\{\hat{g}_p, \hat{\tau}_p, \hat{\psi}_p | 0 \le p < P\}$ together. In yet another embodiment, the CSI preprocessing can be run for each new incoming noisy CSI frame and the past P samples of cleaned or processed CSI can be used for cleaning the new sample. In one embodiment, the value of P can be fixed. In another embodiment, the value of P can be determined by the sensing application, amount of variation in the noisy CSI or by using some external information. For example, the end of a batch of P noisy CSI samples for joint estimation can be identified as the time when the following happens:

$$\sum_{k\in\mathcal{K}}\left(\frac{|\tilde{h}_{P-1,k}|}{\left[\sum_{l\in\mathcal{K}}|\tilde{h}_{P-1,l}|^2\right]^{\frac{1}{2}}} - \sum_{q=0}^{P-1}\frac{|\tilde{h}_{q,k}|}{P\left[\sum_{l\in\mathcal{K}}|\tilde{h}_{q,l}|^2\right]^{\frac{1}{2}}}\right)^2 \le \text{Threshold}$$

but:

$$\sum_{k\in\mathcal{K}}\left(\frac{|\tilde{h}_{P,k}|}{\left[\sum_{l\in\mathcal{K}}|\tilde{h}_{P,l}|^2\right]^{\frac{1}{2}}} - \sum_{q=0}^{P-1}\frac{|\tilde{h}_{q,k}|}{P\left[\sum_{l\in\mathcal{K}}|\tilde{h}_{q,l}|^2\right]^{\frac{1}{2}}}\right)^2 > \text{Threshold}$$

In one embodiment, the CSI preprocessing can be triggered by an external source or a timer. In another embodiment, the CSI preprocessing can be triggered after a sufficient number of noisy CSI samples (i.e., P samples) have been accumulated. In another embodiment, another algorithm can trigger the CSI preprocessing to be performed. For example, a sudden and/or significant variation of the CSI $\tilde{h}_{p,k}$ compared to its past values can be used to trigger the cleaning process. As another embodiment, a new CSI cleaning round can be initiated when the new CSI samples cleaned as part of the current batch of CSI frames becomes too noisy. In yet another embodiment, the TX can trigger the CSI cleaning process by transmitting a frame to the RX. In still another embodiment, the RX can continuously and periodically perform the CSI preprocessing without a trigger.

Figure 5:
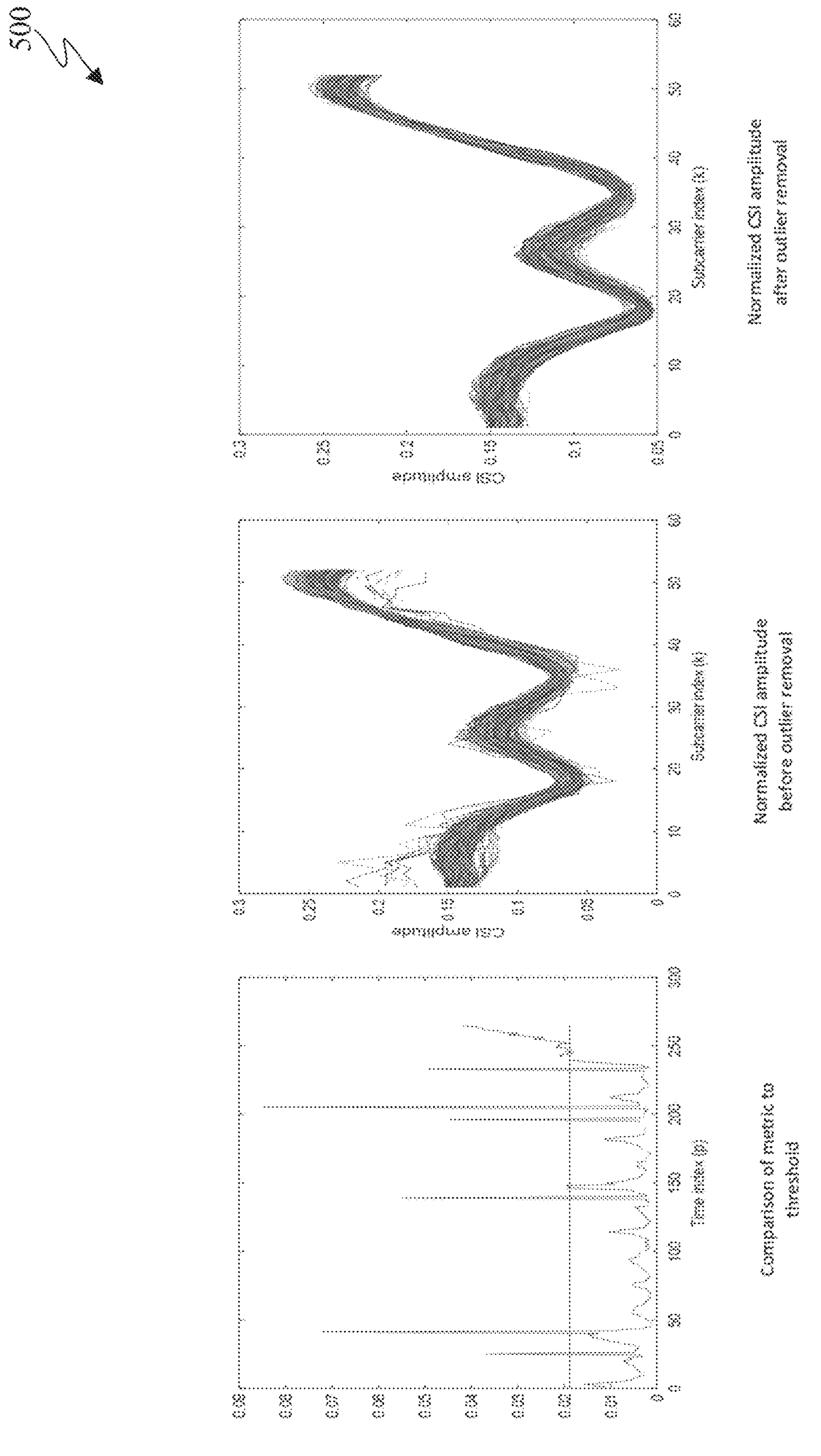
FIG. 5 illustrates an example of outlier removal according to various embodiments of the present disclosure.

FIG. 5 illustrates an example of outlier removal 500 according to various embodiments of the present disclosure. The embodiment of the example outlier removal 500 in FIG. 5 is for illustration only. Other embodiments of the example outlier removal 500 could be used without departing from the scope of this disclosure.

Step 1: Identifying and Removing Outliers:

Of the P CSI samples, some may be too corrupted to be able to correct using gain or phase correction methods. A first step can be to identify and remove such outliers. In one embodiment, the outliers can be identified by checking for each sample $0\le p<P$, if the following equation is satisfied:

$$\sum_{k\in\mathcal{K}}\left(\frac{|\tilde{h}_{p,k}|}{\left[\sum_{l\in\mathcal{K}}|\tilde{h}_{p,l}|^2\right]^{\frac{1}{2}}} - \sum_{q=0}^{P-1}\frac{|\tilde{h}_{q,k}|}{P\left[\sum_{l\in\mathcal{K}}|\tilde{h}_{q,l}|^2\right]^{\frac{1}{2}}}\right)^2 > \text{Threshold}$$

If the above equation is satisfied, then the corresponding noisy CSI sample $\{\tilde{h}_{p,k}|k\in\mathcal{K}\}$ may be too corrupted. After identifying and removing such CSI samples, let the remaining CSI samples be represented by the set $\mathcal{P}\subseteq\{0, \ldots, P-1\}$. An example illustration of such outlier identification and removal is depicted in FIG. 5.

Step 2: Estimating and Removing Gain Error:

The receiver gain for CSI frame p, i.e., $g_p$ can be a combination of the large-scale gain, which adjusts at a slow-time scale, and an automatic gain control (AGC) gain, which updates at a fast-time scale. Let these two gains in decibel (dB) scale be defined as $$g_p^{(1)} \text{ and } g_p^{(2)},$$

respectively, i.e., $$20\times\log_{10}(g_p) = g_p^{(1)} + g_p^{(2)}$$

The gains may follow the following model in one embodiment:

- The large-scale gain can be a slowly varying random process with a Doppler frequency less than 0.1 Hz and may arise due to change in the gain of a low-noise amplifier [25] [26], or drift in TX oscillator frequency $f_c$.
- The AGC gain can be due to the automatic gain control circuit, which for each p may pick a value from a discrete grid, i.e., $$g_p^{(2)} \in \mathcal{G}\ [27][28].$$

In one embodiment, $$g_p^{(2)}$$

is independently distributed for each p with a uniform priority over elements of $\mathcal{G}$.

Figure 6:
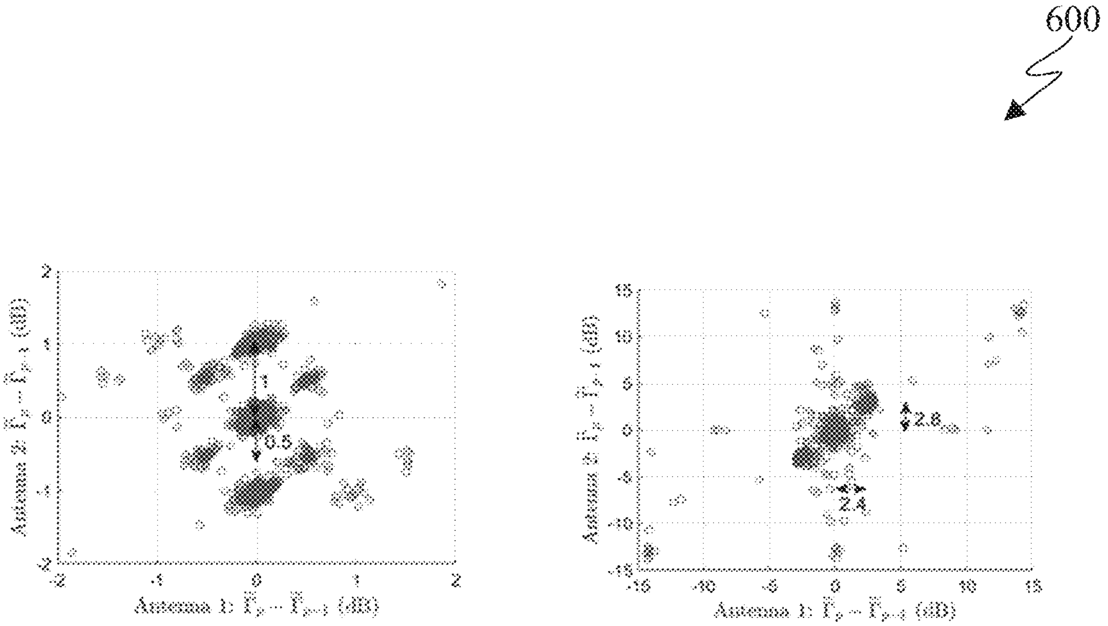
FIG. 6 illustrates an example of CSI power increment between adjacent CSI samples according to various embodiments of the present disclosure.

FIG. 6 illustrates an example of CSI power increment between adjacent CSI samples 600 according to various embodiments of the present disclosure. The embodiment of the example CSI power increment between adjacent CSI samples 600 in FIG. 6 is for illustration only. Other embodiments of the example CSI power increment between adjacent CSI samples 600 could be used without departing from the scope of this disclosure.

The power of the noisy CSI sample in dB scale may be defined as:

$$\tilde{\Gamma}_p = 20\times\log_{10}\left(\sum_{k\in\mathcal{K}}\frac{|\tilde{h}_{p,k}|^2}{K}\right).$$

The above suggested gain model of $$g_p^{(2)}$$

is also evident in plots of $\Delta\tilde{\Gamma}_p \triangleq \tilde{\Gamma}_p - \tilde{\Gamma}_{p-1}$, plotted for two example WiFi receivers in FIG. 6.

The present disclosure provides several algorithms that may be available for estimation of the gain component $g_p$ as further discussed below. In a specific use-case, the algorithm may be determined based on the requirements of the sensing task.

In some embodiments, the gain error term can be estimated for each CSI sample as:

$$\hat{g}_p = \left[\frac{1}{K}\sum_{k\in\mathcal{K}}|\tilde{h}_{p,k}|^2\right]^{\frac{1}{2}}.$$

In some embodiments, a clustering of the noisy CSI powers $\tilde{\Gamma}_p$ can be performed to estimate the gain error terms for each CSI sample $p\in\mathcal{P}$. In this case, a clustering algorithm such as DB-Scan or K-means clustering can be run on $\{\tilde{\Gamma}_p|p\in\mathcal{P}\}$ to cluster the CSI samples into different AGC gain levels. For each identified cluster, the mean value of $\tilde{\Gamma}_{p,m}$ can be used to estimate the gain term for that cluster as:

$$\hat{g}_p = 10^{\sum_{q \in \mathcal{P}_p} \tilde{\Gamma}_p / (20|\mathcal{P}_p|)},$$

where $\mathcal{P}_p \subseteq \mathcal{P}$ is the set of all CSI samples that are assigned to the same cluster as p by the clustering algorithm. In one example where DB-Scan is used, the clustering algorithm parameters may be set as $\epsilon=0.15$ and min-points=1. In another example where K-means clustering is used, the number of clusters may be set as 3 or 5.

In some embodiments, the structure of the gain error having a slow-varying component $$g_p^{(1)}$$

and a fast-varying component $$g_p^{(2)}$$

can be exploited. In this case, the clustering may be performed on increments of CSI power $\Delta\tilde{\Gamma}_p \triangleq \tilde{\Gamma}_p - \tilde{\Gamma}_{p-1}$ to estimate the AGC gain $$g_p^{(2)}.$$

Then a low pass filter may be used to estimate the large-scale gain $$g_p^{(1)}.$$

This can be performed as in the following algorithm:

---

Inputs: $\tilde{\Gamma}_p$ for $p \in \mathcal{P}$
Calculate $\Delta\tilde{\Gamma}_p \triangleq \tilde{\Gamma}_p - \tilde{\Gamma}_{p-1}$ for each $p \in \mathcal{P}$.
Run DB-SCAN on $\{\Delta\tilde{\Gamma}_p \mid p \in \mathcal{P}\}$ with $\epsilon = 0.2$ and min-points = 1.
For $p \in \mathcal{P}$ Compute $\hat{g}_p^{(2)} = \hat{g}_{p-1}^{(2)} + \sum_{q \in \mathcal{P}_p} \Delta\tilde{\Gamma}_q / |\mathcal{P}_p|$ endFor Compute $\hat{g}_p^{(1)} = \text{LPF}_{0.1}\{\tilde{\Gamma}_p - \hat{g}_p^{(2)}\}$ for each $p \in \mathcal{P}$.

//Here $\text{LPF}_{0.1}\{.\}$ is a low pass filter, e.g., moving average filter, with cut-off frequency of 0.1 Hz.
Return $\hat{g}_p = 10^{(g_p^{(1)} + g_p^{(2)})/20}$ for each $p \in \mathcal{P}$.

---

In some embodiments, the structure of the gain error having a slow-varying component $$g_p^{(1)}$$

and a fast-varying component $$g_p^{(2)},$$

and the fast-varying component having a specific grid of values, i.e., $$g_p^{(2)} \in \mathcal{G}$$

can be exploited. This can be performed as in the following algorithm:

---

Inputs: $\tilde{\Gamma}_p$ for $p \in \mathcal{P}$

Compute $\lambda_{max} = 1.5 \times \left(\max_p\{\tilde{\Gamma}_p\} - \min_p\{\tilde{\Gamma}_p\}\right)$.

For $\lambda = 0.005\ \lambda_{max}: 0.005\ \lambda_{max}: \lambda_{max}$

Compute $\tilde{\Xi}_p = \exp\{j2\pi\tilde{\Gamma}_p/\lambda\}$ for each $p \in \mathcal{P}$.
Compute $\overline{\Xi}_p = \text{LPF}_{0.1}\{\tilde{\Xi}_p\}$.

//Here $\text{LPF}_{0.1}\{.\}$ is a low pass filter, e.g., moving average filter, with cut-off frequency of 0.1 Hz.

Compute $\hat{g}_p^{(1)} = \mathcal{U}(\angle\overline{\Xi}_p)\lambda/2\pi$.

//Here $\mathcal{U}(.)$ is a phase-unwrapping function that for each $p \in \mathcal{P}$ adds integer shifts of $2\pi$ to the argument to ensure that phase-difference to preceding CSI frame satisfies $|\angle\overline{\Xi}_p - \angle_{p-1}| \le \pi$.

Compute $\hat{g}_p^{(2)} = \lambda\left(\left\lfloor(\tilde{\Gamma}_p - \hat{g}_p^{(1)})/\lambda\right\rfloor - \frac{1}{2}\right)$.
Compute $\hat{\Gamma}_p = \tilde{\Gamma}_p - \hat{g}_p^{(1)} - \hat{g}_p^{(2)}$.

If $\Sigma_{p \in P}(\hat{\Gamma}_p)^2/|\mathcal{P}| \le \lambda^2/24$

Compute $\hat{\sigma}_\Gamma^2 = -\frac{\lambda^2}{2\pi}\log\left|\frac{1}{|\mathcal{P}|}\sum_{p \in \mathcal{P}} \exp\{j2\pi\hat{\Gamma}_p/\lambda\}\right|$.
Compute $\mathcal{D} = \sum_{z \in \mathbb{Z}}\left[Q\left(\left(z - \frac{1}{2}\right)\frac{\lambda}{\hat{\sigma}_\Gamma}\right) - Q\left(\left(z + \frac{1}{2}\right)\frac{\lambda}{\hat{\sigma}_\Gamma}\right)\right]z^2$.

//Here $Q(.)$ is the standard Q-function and $\mathbb{Z}$ is the set of all integers.
Compute $\text{Obj}(\lambda) = \hat{\sigma}_\Gamma^2 + \lambda^2\mathcal{D}$
Else
Obj($\lambda$) = $\infty$
endIf
endFor
For $\lambda$ with minimum value of Obj($\lambda$), recompute $g_p^{(1)}$, $g_p^{(2)}$ as above.
Return $\hat{g}_p = 10^{(g_p^{(1)} + g_p^{(2)})/20}$ for each $p \in \mathcal{P}$.

---

Figure 7:
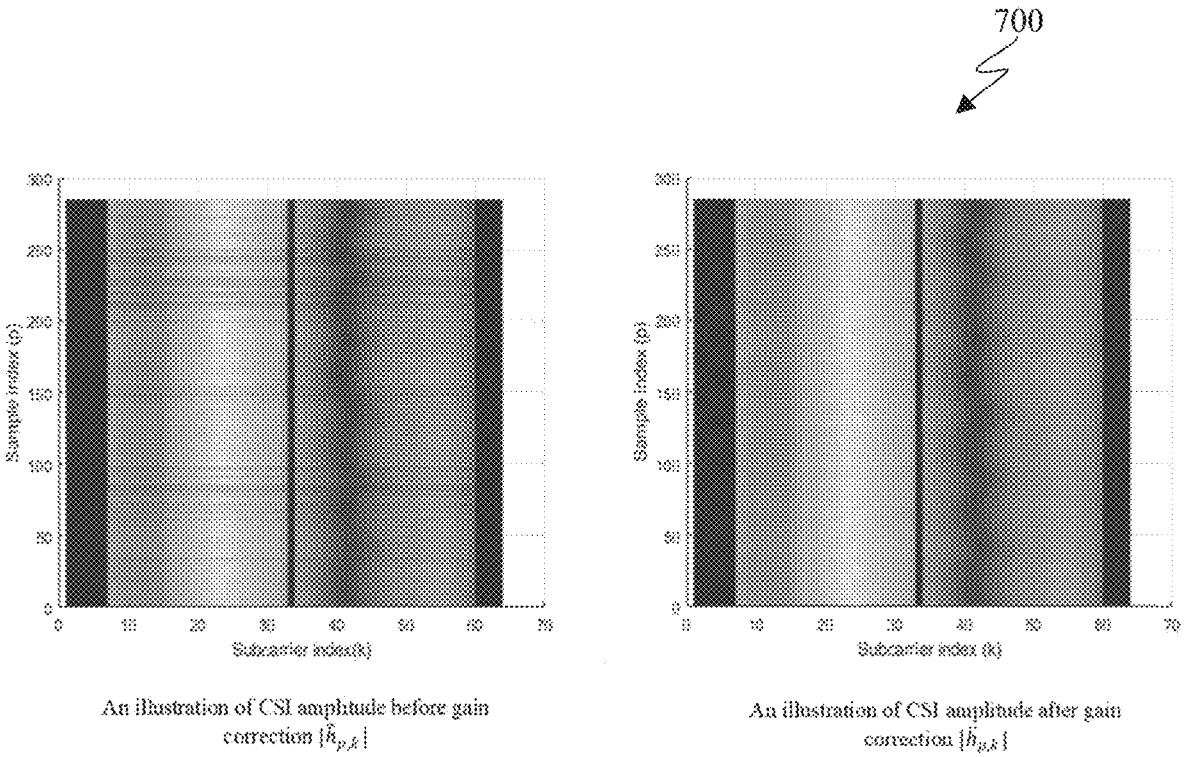
FIG. 7 illustrates an example of the impact of CSI gain correction on the CSI amplitude according to various embodiments of the present disclosure.

FIG. 7 illustrates an example of the impact of CSI gain correction on the CSI amplitude 700 according to various embodiments of the present disclosure. The embodiment of the example of the impact of CSI gain correction on the CSI amplitude 700 shown in FIG. 7 is for illustration only. Other embodiments of the example of the impact of CSI gain correction on the CSI amplitude 700 could be used without departing from the scope of this disclosure.

Using any of the above gain error estimation methods, the gain-corrected CSI $\{\bar{h}_{p,k} \mid p \in \mathcal{P}, k \in \mathcal{K}\}$ can be obtained as:

$$\bar{h}_{p,k} \triangleq \tilde{h}_{p,k}/\hat{g}_p.$$

An illustration of the result of such gain correction on the amplitude of the CSI is shown in FIG. 7.

Because different embodiments offer different trade-offs between estimation accuracy and computational complexity, an algorithm can be used to determine the appropriate embodiment to use for gain-error correction based on the requirements of the sensing application and the computational capabilities of the hardware. For example, if running on a phone or a device with low computational complexity, a low computational complexity method may be used.

Step 3: Estimating and Removing Phase Errors:

In this step, the gain corrected CSI $\{\bar{h}_{p,k} | p \in \mathcal{P}, k \in \mathcal{K}\}$ may be used for estimating the values of $\tau_p$, $\psi_p$. Note that:

$$\bar{h}_{p,k} \approx h_{p,k} e^{-j2\pi f_k \tau_p} e^{-j\psi_p},$$

in other words, the CSI phase may be corrupted by the timing error $\tau_p$ and the common phase error (CPE) $\psi_p$. This step attempts to find good estimates $\hat{\tau}_p$, $\hat{\psi}_p$ of $\tau_p$, $\psi_p$, respectively, to obtain the gain and phase corrected CSI as:

$$\hat{h}_{p,k} = \bar{h}_{p,k} e^{j2\pi f_k \hat{\tau}_p} e^{j\hat{\psi}_p}.$$

In some embodiments, the timing error $\tau_p$ can arise from two sources: (i) the sampling time granularity of the ADC at the RX and (ii) the error in the symbol start time estimated using the L-STF of the CSI frame, and it may be limited by the inverse of the OFDM system bandwidth, viz., $\tau_s/K$. Therefore, the timing error may be modeled as $$\tau_p \sim Uni\left(-\frac{\kappa T_s}{K}, \frac{\kappa T_s}{K}\right),$$

where $\kappa$ is a system parameter that depends on the accuracy of the RX timing compensation (for example $\kappa \approx 20$). Furthermore, because synchronization may be performed independently for each CSI frame, the timing error $\tau_p$ can be also independently distributed for each $p \in \mathcal{P}$.

For CPE, note that $\psi_p = \mathrm{mod}\,[\psi_p + 2\pi f_c \tau_p, 2\pi]$, and $\psi_p$ is the difference in the carrier phase between the TX and RX at time of transmission of the p-th CSI acquisition frame, i.e., $pT_{rep}$. Considering typical values of $f_c$=5 GHz and $T_{rep}$=50 ms, this corresponds to $2.5\times10^8$ cycles of the carrier between two CSI frames. Preventing oscillator drift over so many cycles between the RX and TX may be difficult. Thus, in one embodiment, $\psi_p$, and consequently also $\psi_p$, can be modeled to be independent for each $p \in \mathcal{P}$ and uniformly distributed, i.e., $\psi_p \sim Uni(-\pi, \pi)$. Note that this model may also explain the experimental observations made in [9] about the (uncorrected) channel phase, and the behavior of $\angle h_{p,k}$ in FIG. 4. The above suggested timing error model is also evident in plots of statistics of $\tau_p$, plotted for two example WiFi receivers in FIG. 8. The above suggested phase error model is also evident in plots of statistics of $\psi_p$, plotted for two example WiFi receivers in FIG. 9.

Figure 8:
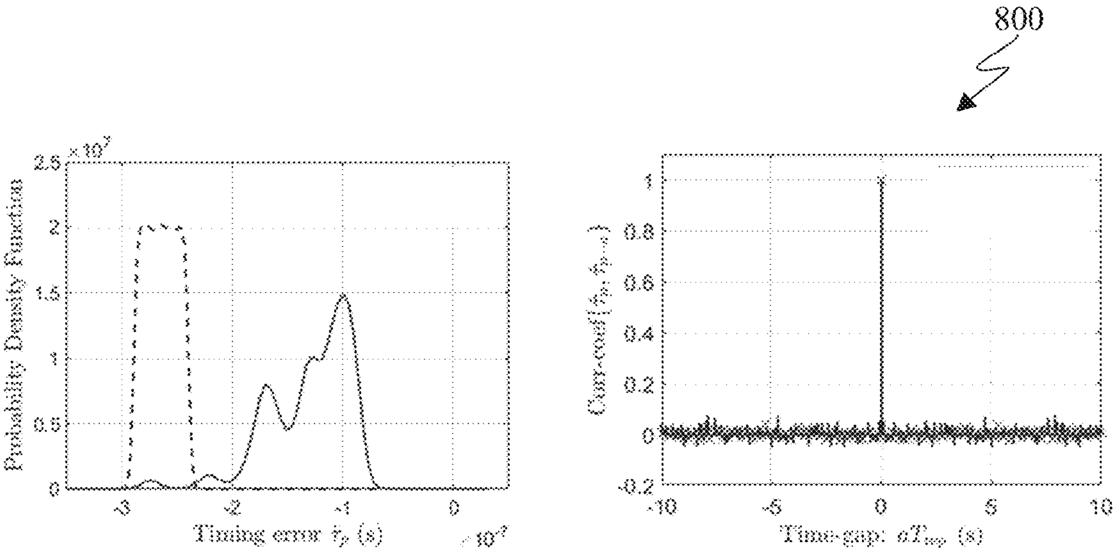
FIG. 8 illustrates an example of different statistics of CSI timing errors according to various embodiments of the present disclosure.

FIG. 8 illustrates an example of different statistics of CSI timing errors 800 according to various embodiments of the present disclosure. The embodiment of the example of different statistics of CSI timing errors 800 shown in FIG. 8 is for illustration only. Other embodiments of the example of different statistics of CSI timing errors 800 could be used without departing from the scope of this disclosure.

Figure 9:
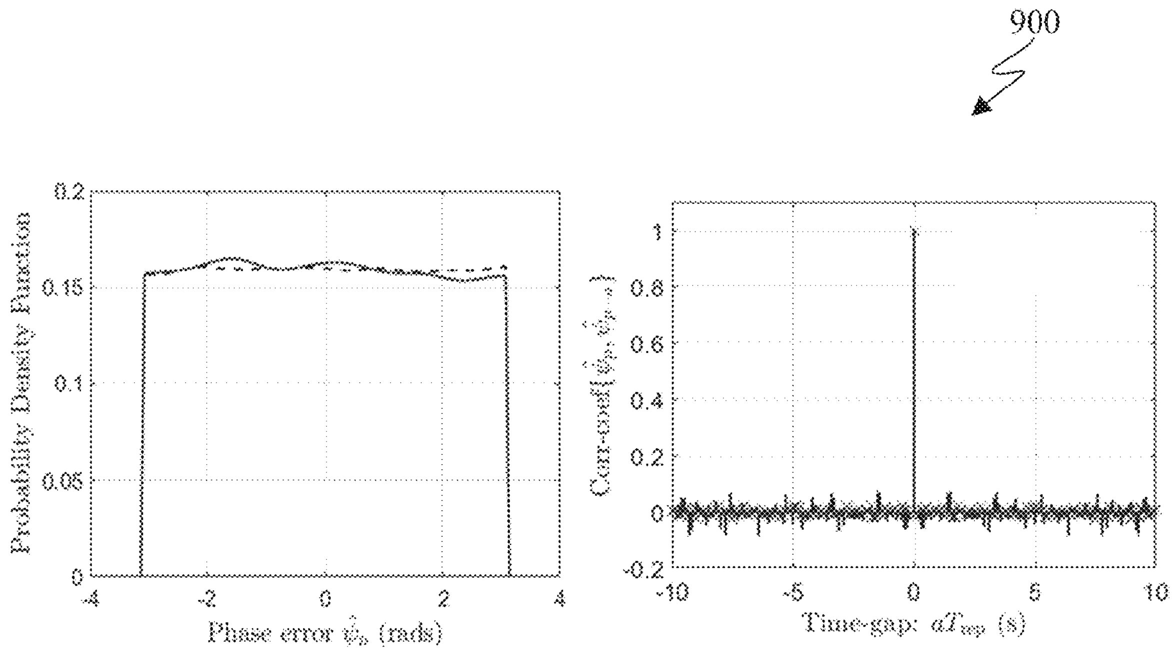
FIG. 9 illustrates an example of different statistics of CSI phase errors according to various embodiments of the present disclosure.

FIG. 9 illustrates an example of different statistics of CSI phase errors 900 according to various embodiments of the present disclosure. The embodiment of the example of different statistics of CSI phase errors 900 shown in FIG. 9 is for illustration only. Other embodiments of the example of different statistics of CSI phase errors 900 could be used without departing from the scope of this disclosure.

Several algorithms may be available for estimation of the timing and phase errors $\hat{\tau}_p$, $\hat{\psi}_p$ as discussed in the embodiments below. In a specific use-case, the desired algorithm may be determined based on the requirements of the sensing task.

In some embodiments, the timing and CPE error can be estimated as a solution to the least squares problem:

$$\hat{\tau}_p, \hat{\psi}_p = \underset{\tau\in\mathbb{R},\psi\in\mathbb{R}}{\mathrm{argmin}}\left\{\sum_{k\in\mathcal{K}}\left(2\pi f_k \tau + \psi - \mathcal{U}\left[\angle\bar{h}_{p,k}\right]\right)^2\right\},$$

where $\mathcal{U}(\cdot)$ is a phase-unwrapping function that for each $k \in \mathcal{K}$ adds integer shifts of 2× to the argument $\angle h_{p,k}$ to ensure that the phase-difference from previous subcarrier satisfies $|\angle\bar{h}_{p,k} - \angle h_{p,k-1}| \le \pi$.

In some embodiments, the timing error can be estimated as:

$$\hat{\tau}_p = \frac{T_s}{2\pi}\angle\left[\sum_{k=0}^{K-2}\bar{h}_{p,k}\bar{h}^*_{p,k}\right],$$

and similarly, the CPE error can be estimated as:

$$\hat{\psi}_p = -\angle\left[\sum_{k\in\mathcal{K}}\bar{h}_{p,k}e^{j2\pi f_k\hat{\tau}_p}\right].$$

In some embodiments, it may be considered that the TX and RX have a strong line-of-sight path. In this case, an initial estimate of the line-of-sight component of the channel can be obtained first as $\bar{b}_k$. The timing and CPE errors can be estimated via maximum-likelihood estimation as shown in the following algorithm:

---

Inputs: $\bar{h}_{p,k}$ for $p \in \mathcal{P}$, $k \in \mathcal{K}$.

For $p \in \mathcal{P}$

Compute $\bar{\tau}_p = \frac{T_s}{2\pi}\angle\left[\sum_{k=0}^{K-2}\bar{h}_{p,k}\bar{h}^*_{p,k}\right]$.

Compute $\bar{\psi}_p = -\angle\left[\sum_{k\in\mathcal{K}}\bar{h}_{p,k}e^{j2\pi f_k\hat{\tau}_p}\right]$.

endFor

For $k \in \mathcal{K}$

Compute $\bar{b}_k = \sum_{p\in\mathcal{P}}\bar{h}_{p,k}e^{j(2\pi f_k\bar{\tau}_p + \bar{\psi}_p)}/|\mathcal{P}|$.

endFor

For $p \in \mathcal{P}$

Compute $\hat{\tau}_p = \underset{|\tau|\le\kappa T_s/K}{\mathrm{argmax}}\left|\sum_{k\in\mathcal{K}}e^{-j2\pi f_k\tau}\bar{h}^*_{p,k}\bar{b}_k\right|$.

Compute $\hat{\psi}_p = \angle\left[\sum_{k\in\mathcal{K}}e^{-j2\pi f_k\hat{\tau}_p}\bar{h}^*_{p,k}\bar{b}_k\right]$.

endFor

Return $\hat{\tau}_p$, $\hat{\psi}_p$ for each $p \in \mathcal{P}$.

---

In some embodiments, to reduce the complexity of search for $\hat{\tau}_p$ in one or more embodiments described herein, a weighted least squares solution can be used. In addition, to reduce the noise and errors, the summation over subcarriers can be reduced to a smaller subcarrier set $\bar{\mathcal{K}}$, as shown in the following algorithm:

---

Inputs: $\bar{h}_{p,k}$ for $p \in \mathcal{P}$, $k \in \mathcal{K}$.
For $p \in \mathcal{P}$ Compute $\bar{\tau}_p = \frac{T_s}{2\pi} \angle \left[ \sum_{k=0}^{K-2} \bar{h}_{p,k} \bar{h}_{p,k}^* \right]$.

Compute $\bar{\psi}_p = -\angle \left[ \sum_{k \in \mathcal{K}} \bar{h}_{p,k} e^{j2\pi f_k \bar{\tau}_p} \right]$.

endFor
For $k \in \mathcal{K}$

Compute $\bar{b}_k = \sum_{p \in \mathcal{P}} \bar{h}_{p,k} e^{j(2\pi f_k \bar{\tau}_p + \bar{\psi}_p)} / |\mathcal{P}|$.

endFor

Compute $\bar{\mathcal{K}} = \{ k \in \mathcal{K} \,|\, |\bar{b}_k|^2 > 0.1 \}$.

For $p \in \mathcal{P}$

Compute $\omega_{p,k} = \bar{h}_{p,k}^* \bar{b}_k e^{-j2\pi f_k \bar{\tau}_p}$ for $k \in \bar{\mathcal{K}}$.

Compute $\hat{\tau}_p, \hat{\psi}_p = \underset{\tau \in \mathbb{R}, \psi \in \mathbb{R}}{\mathrm{argmin}} \left\{ \sum_{k \in \bar{\mathcal{K}}} \omega_{p,k} [2\pi f_k (\tau - \bar{\tau}_p) + \psi - \mathcal{U}(\angle \omega_{p,k})]^2 \right\}$.

// Here$\mathcal{K}$ $\mathcal{U}(.)$ is a phase-unwrapping function that for each $k \in \bar{\mathcal{K}}$ adds integer shifts of $2\pi$ to the argument to ensure that the phase-difference from previous sub-carrier in $k_1 \in \bar{\mathcal{K}}$ satisfies $|\angle\omega_{p,k} - \angle\omega_{p,k_1}| \le \pi$.
endFor
Return $\hat{\tau}_p$, $\hat{\psi}_p$ for each $p \in \mathcal{P}$.

---

In some embodiments, it may be assumed that the channel between the TX and RX can have multi-path and correspondingly a small coherence bandwidth. Correspondingly, unlike in one or more embodiments described herein, the estimate of the static component $\bar{b}_k$ may be refined after a sufficient number of CSI samples have been corrected (viz., p>P/10) as shown in the following algorithm:

---

Inputs: $\bar{h}_{p,k}$ for $p \in \mathcal{P}$, $k \in \mathcal{K}$.
For $p \in \mathcal{P}$ Compute $\bar{\tau}_p = \frac{T_s}{2\pi} \angle \left[ \sum_{k=0}^{K-2} \bar{h}_{p,k} \bar{h}_{p,k}^* \right]$.

Compute $\bar{\psi}_p = -\angle \left[ \sum_{k \in \mathcal{K}} \bar{h}_{p,k} e^{j2\pi f_k \bar{\tau}_p} \right]$.

endFor
For $k \in \mathcal{K}$

Compute $\bar{b}_k = \sum_{p \in \mathcal{P}} \bar{h}_{p,k} e^{j(2\pi f_k \bar{\tau}_p + \bar{\psi}_p)} / |\mathcal{P}|$.

endFor
For $p \in \mathcal{P}$

Compute $\hat{\tau}_p = \underset{|\tau| \le \kappa T_s / K}{\mathrm{argmax}} \left| \sum_{k \in \mathcal{K}} e^{-j2\pi f_k \tau} \bar{h}_{p,k}^* \bar{b}_k \right|$.

Compute $\hat{\psi}_p = -\angle \left[ \sum_{k \in \mathcal{K}} e^{-j2\pi f_k \hat{\tau}_p} \bar{h}_{p,k}^* \bar{b}_k \right]$.

Compute $\hat{h}_{p,k} = \bar{h}_{p,k} e^{j2\pi f_k \hat{\tau}_p} e^{j\hat{\psi}_p}$.

If p > P/10

-continued

Define $Q_p = \{ p \in \mathcal{P} \,|\, q \le p \}$

Update $\bar{b}_k = \sum_{q \in Q_p} \hat{h}_{q,k} / |Q_p|$.

endIF
endFor
Return $\hat{\tau}_p$, $\hat{\psi}_p$, $\psi_p$ for each p ∈$\bar{h}$ $\mathcal{P}$.

---

In a variant of this embodiment, the update of $\bar{b}_k$, can be changed to a recursive definition like $\bar{b}_k = \alpha \bar{b}_k + (1-\alpha) \hat{h}_{p,k}$ inside the loop for each p, where a is some design parameter, e.g., $\alpha = 0.9$.

In some embodiments, to reduce the complexity of search for $\tau_p$ in one or more embodiments described herein, a weighted least squares solution can be used. In addition, to reduce the noise and errors, the summation over subcarriers can be reduced to a smaller subcarrier set $\bar{\mathcal{K}}$, as shown in the following algorithm:

---

Inputs: $\bar{h}_{p,k}$ for $p \in \mathcal{P}$, $k \in \mathcal{K}$.
For $p \in \mathcal{P}$ Compute $\bar{\tau}_p = \frac{T_s}{2\pi} \angle \left[ \sum_{k=0}^{K-2} \bar{h}_{p,k} \bar{h}_{p,k}^* \right]$.

Compute $\bar{\psi}_p = -\angle \left[ \sum_{k \in \mathcal{K}} \bar{h}_{p,k} e^{j2\pi f_k \bar{\tau}_p} \right]$.

endFor
For $k \in \mathcal{K}$

Compute $\bar{b}_k = \sum_{p \in \mathcal{P}} \bar{h}_{p,k} e^{j(2\pi f_k \bar{\tau}_p + \bar{\psi}_p)} / |\mathcal{P}|$.

endFor

Compute $\bar{\mathcal{K}} = \{ k \in \mathcal{K} \,|\, |\bar{b}_k|^2 > 0.1 \}$.

For $p \in \mathcal{P}$

Compute $\omega_{p,k} = \bar{h}_{p,k}^* \bar{b}_k e^{-j2\pi f_k \bar{\tau}_p}$ for $k \in \bar{\mathcal{K}}$.

Compute $\hat{\tau}_p, \hat{\psi}_p = \underset{\tau \in \mathbb{R}, \psi \in \mathbb{R}}{\mathrm{argmin}} \left\{ \sum_{k \in \bar{\mathcal{K}}} \omega_{p,k} [2\pi f_k (\tau - \bar{\tau}_p) + \psi - \mathcal{U}(\angle \omega_{p,k})]^2 \right\}$.

//Here $\mathcal{U}(.)$ is a phase-unwrapping function that for each $k \in \bar{\mathcal{K}}$ adds integer shifts of $2\pi$ to the argument to ensure that the phase-difference from previous sub-carrier in $k_1 \in \bar{\mathcal{K}}$ satisfies $|\angle\omega_{p,k} - \angle\omega_{p,k_1}| \le \pi$.

Compute $\hat{h}_{p,k} = \bar{h}_{p,k} e^{j2\pi f_k \hat{\tau}_p} e^{j\hat{\psi}_p}$.

If p > P/10

Define $Q_p = \{ p \in \mathcal{P} \,|\, q \le p \}$

Update $\bar{b}_k = \sum_{q \in Q_p} \hat{h}_{q,k} / |Q_p|$.

endIf
endFor
Return $\hat{\tau}_p$, $\hat{\psi}_p$ for each $p \in \mathcal{P}$.

---

In a variant of this embodiment, the update of $\bar{b}_k$, can be changed to a recursive definition like $\bar{b}_k = \alpha \bar{b}_k + (1-\alpha) \hat{h}_{p,k}$ inside the loop for each p, where a is some design parameter, e.g., $\alpha = 0.9$.

In some embodiments, an additional backward pass for improving the estimation of $\hat{\tau}_p$, $\hat{\psi}_p$ from one or more embodiments described herein can be added for p<P/2. This is because CSI frames for p<P/2 may have insufficient history for accurate correction. This method can be performed as shown in the below algorithm:

---

Inputs: $\overline{h}_{p,k}$ for $p \in \mathcal{P}$, $k \in \hat{\tau}\ \hat{\psi}\mathcal{K}$.
Run algorithm in one or more embodiments described herein to obtain estimates of $\hat{\tau}_p$, $\hat{\psi}_p$ for each $p \in \hat{\tau}\mathcal{P}$.

Redefine $Q_p = \{p \in \mathcal{P} \mid q > P/2\}$.
Update $\overline{b}_k = \sum_{q \in Q_p} \hat{h}_{q,k}/|Q_p|$.

For $p = \lfloor P/2 \rfloor$: (−1): 0

$\hat{\psi}$ Compute $\hat{\tau}_p = \underset{|\tau| \le \kappa T_s/K}{\operatorname{argmax}} \left| \sum_{k \in \mathcal{K}} e^{-j2\pi f_k \tau} \overline{h}^*_{p,k} \overline{b}_k \right|$.

Compute $\hat{\psi}_p = -\angle\left[\sum_{k \in \mathcal{K}} e^{-j2\pi f_k \hat{\tau}_p} \overline{h}^*_{p,k} \overline{b}_k\right]$.

endFor
Return $\hat{\tau}_p$, $\hat{\psi}_p$ for each $p \in \mathcal{P}$.

---

In some embodiments, an additional backward pass for improving the estimation of $\hat{\tau}_p$, $\hat{\psi}_p$ from one or more embodiments described herein can be added for p<P/2. This is because CSI frames for p<P/2 may have insufficient history for accurate correction. This method can be performed as shown in the below algorithm:

---

Inputs: $\overline{h}_{p,k}$ for $p \in \mathcal{P}$, $k \in \overline{\tau}\ \mathcal{K}$.
Run algorithm in one or more embodiments described herein to obtain estimates of $\overline{b}_k$, $\hat{\tau}\overline{\tau}_p$, $\hat{\tau}_p$, $\hat{\psi}_p$, for each $p \in \mathcal{P}$.

Redefine $Q_p = \{p \in \mathcal{P} \mid q > P/2\}$.
Update $\overline{b}_k = \sum_{q \in Q_p} \hat{h}_{q,k}/|Q_p|$.

For $p = \lfloor P/2 \rfloor$: (−1): 0

Compute $\omega_{p,k} = \overline{h}^*_{p,k} \overline{b}_k e^{-j2\pi f_k \overline{\tau}_p}$ for $k \in \overline{\mathcal{K}}$.

Compute $\hat{\tau}_p, \hat{\psi}_p = \underset{\tau \in \mathbb{R}, \psi \in \mathbb{R}}{\operatorname{argmin}} \left\{ \begin{array}{c} \sum_{k \in \overline{\mathcal{K}}} \omega_{p,k} [2\pi f_k (\tau - \overline{\tau}_p) + \\ \psi - \mathcal{U}(\angle\omega_{p,k})]^2 \end{array} \right\}$.

//Here $\mathcal{U}(.)$ is a phase-unwrapping function that for each $k \in \overline{\mathcal{K}}$ adds integer shifts of $2\pi$ to the argument to ensure that the phase-difference from previous sub-carrier in $k_1 \in \overline{\mathcal{K}}$ satisfies:

$$\left|\angle\omega_{p,k} - \angle\omega_{p,k_1}\right| \le \pi$$

endFor
Return $\hat{\tau}_p$, $\hat{\psi}_p$ for each $p \in \overline{h}\mathcal{P}$.

---

Figure 10:
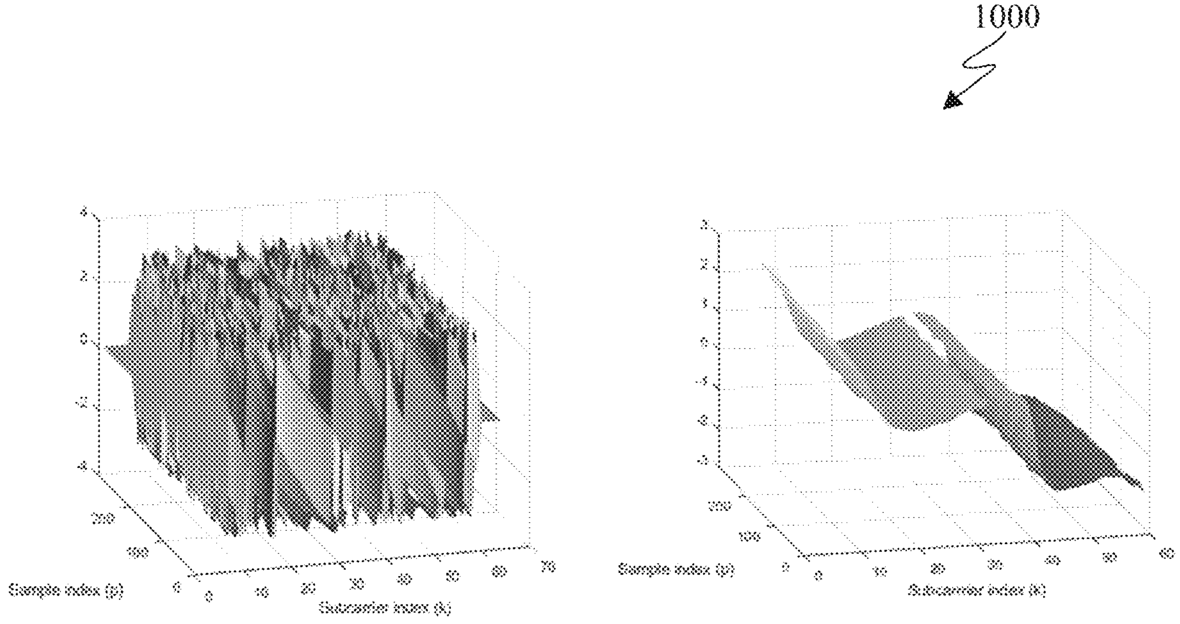
FIG. 10 illustrates an example of the impact of CSI gain correction on the CSI amplitude according to various embodiments of the present disclosure.

FIG. 10 illustrates an example of the impact of CSI gain correction on the CSI amplitude 1000 according to various embodiments of the present disclosure. The embodiment of the example of the impact of CSI gain correction on the CSI amplitude 1000 shown in FIG. 10 is for illustration only. Other embodiments of the example of the impact of CSI gain correction on the CSI amplitude 1000 could be used without departing from the scope of this disclosure.

In one variant of step 3, instead of using a conventional phase unwrapping function $\mathcal{U}(\cdot)$, a robust phase unwrapping function defined as:

$$\tilde{\mathcal{U}}(\angle\omega_{p,k}) = \operatorname{mod}\left\{\angle\omega_{p,k} - \mathcal{U}\left(\sum_{\ell \in \mathcal{L}(k)} \omega_{p,\ell}\right) + \pi, 2\pi\right\} - \pi + \mathcal{U}\left(\sum_{\ell \in \mathcal{L}(k)} \omega_{p,\ell}\right),$$

may be used, where $\mathcal{L}(k)$ is a set that includes k and its 3 preceding and 3 succeeding indices in the sorted set $\overline{\mathcal{K}}$. Such a phase unwrapping may be more robust to impact the effects of channel noise than conventional phase unwrapping.

Step 4: Identifying and Removing Outliers (2):

Of the $\mathcal{P}$ corrected CSI samples, some may be too corrupted to be able to use for the purpose of sensing. Accordingly, after step 3, an additional step can be performed to identify and remove such outliers. In some embodiments, the outliers can be identified by checking for each sample $p \in \mathcal{P}$, if the following equation is satisfied:

$$\sum_{k \in \mathcal{K}} \left( \hat{h}_{p,k} - \sum_{q \in \mathcal{P}} \frac{\hat{h}_{p,k}}{|\mathcal{P}|} \right)^2 > \text{Threshold}$$

If the above equation is satisfied, then the corresponding noisy CSI sample $\{\hat{h}_{p,k} | k \in \mathcal{K}\}$ may be too corrupted. After identifying and removing such CSI samples, the remaining CSI samples may be represented by the set $\mathcal{P}^* \subseteq P$. Finally, $\{\hat{h}_{p,k} | p \in \mathcal{P}^*, k \in \mathcal{K}\}$ can be used as the corrected CSI parameters to use as input for the sensing algorithm/method.

Because different embodiments offer different trade-offs between estimation accuracy and computational complexity, an algorithm can be used to determine the appropriate embodiment to use for phase-error correction based on the requirement of the sensing application and the computational capabilities of the hardware. For example, if running on a phone or a device with low computational complexity, a low computational complexity method may be used.

Figure 11:
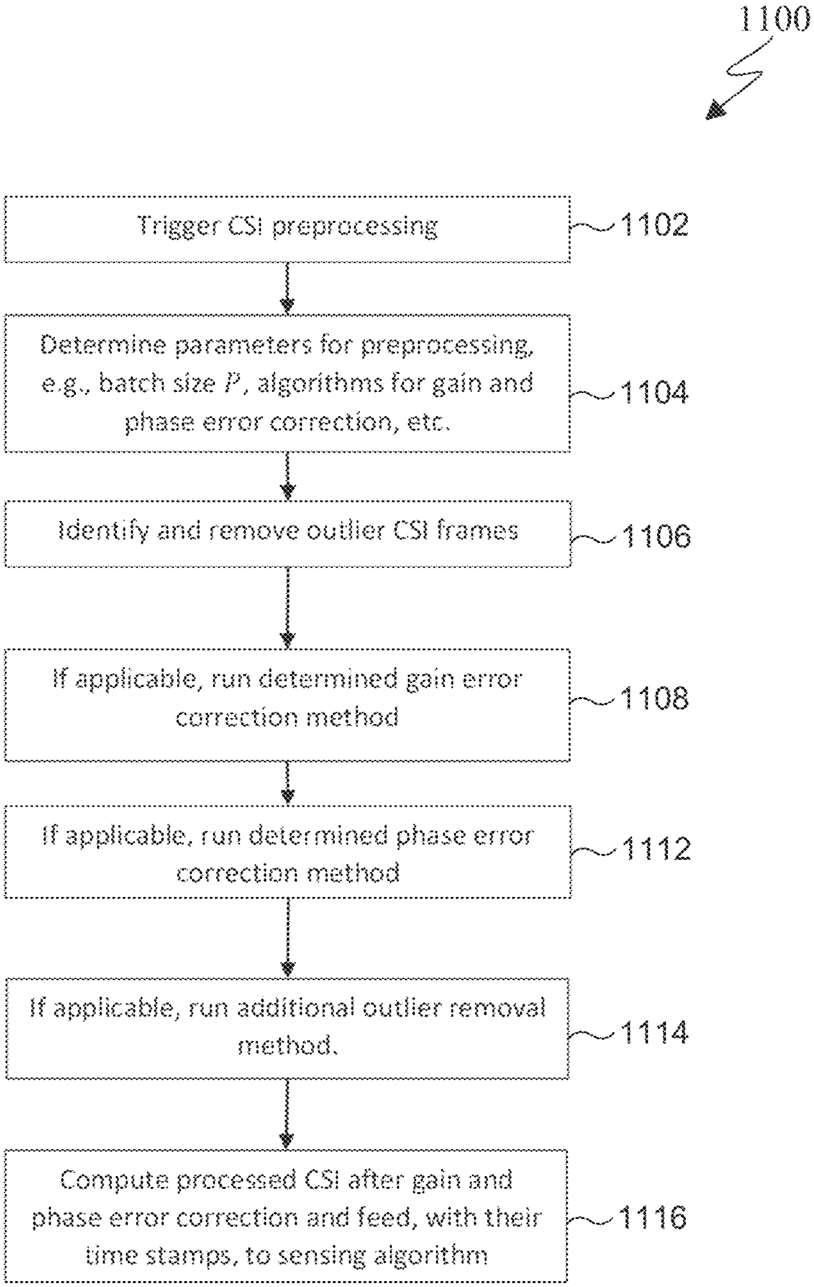
FIG. 11 illustrates an example flow diagram of a method for preprocessing WiFi CSI for supporting sensing applications according to various embodiments of the present disclosure.

FIG. 11 illustrates an example flow diagram of a method 1100 for preprocessing WiFi CSI for supporting sensing applications according to various embodiments of the present disclosure. The embodiment of the example method 1100 for preprocessing WiFi CSI for supporting sensing applications shown in FIG. 11 is for illustration only. Other embodiments of the example method 1100 for preprocessing WiFi CSI for supporting sensing applications could be used without departing from the scope of this disclosure.

As illustrated in FIG. 11, at step 1102, a trigger from a timer, external source or another algorithm is used to trigger the CSI preprocessing. At step 1104, the appropriate parameters for the CSI preprocessing are computed, including the batch size P, whether the gain correction and phase correction are required, the appropriate algorithms to use for gain and phase correction, etc. At step 1106, outlier detection and removal can be performed to remove the CSI samples that are too corrupted and thus obtain reduced batch $\mathcal{P}$. At step 1108, the determined gain error estimation and correction method can be applied to the raw CSI samples $\tilde{h}_{p,k}$ to obtain the gain corrected CSI samples $\overline{h}_{p,k}$. At step 1110, the determined phase error estimation and correction method can be applied to the gain corrected CSI samples $\overline{h}_{p,k}$ to obtain the gain+phase corrected CSI samples $\hat{h}_{p,k}$. At step 1112, an additional outlier removal step may be performed to remove some samples to identify a cleaned CSI set $\mathcal{P}^*$. At step 1114, the preprocessed CSI samples $\{\hat{h}_{p,k} | p \in \mathcal{P}^*, k \in \mathcal{K}\}$ can be fed to an appropriate sensing algorithm along with the time stamps or frame indices $\mathcal{P}^*$.

Comparison of Gain-Error Correction Embodiments:

A comparison of the performance of the different algorithms described herein for gain-error correction using over 2000 realizations of simulated channels was performed. For the simulations, the following values were used: $T_{rep}$=100 ms, $\mathcal{P}$={0,1, . . . ,299} and $\mathcal{K}$={0,1, . . . ,255}. In each realization $h_{p,k}$ is generated as:

$$h_{p,k}=b_k+d_{p,k},$$

where $b_k$ is the static component of CSI that includes the line-of-sight path, reflected from static objects such as walls, and $d_{p,k}$ is the dynamic component of CSI that is time varying and includes the variation to be sensed by the sensing algorithm. For the simulations, the static component $b_k$ may be generated using the 802.11ax Model-C channel model, and for the dynamic component the following cases may be considered:

i. $d_{p,k}$ is complex Gaussian distributed with variance 1−γ, i.e., $d_{p,k}\sim\mathcal{CN}(0,1-\gamma)$ and it is independent and identically distributed for each p∈ $\mathcal{P}$ and each k∈ $\mathcal{K}$.

ii. $d_{p,k}=\alpha_p e^{-j\pi f_k(\tau+\tau_0)}$, where τ~Uni[0,300) ns, $\tau_0$ is the delay of the line-of-sight path in $b_k$, and $\alpha_0$ is a complex Gaussian process of variance 1−γ with the Doppler power spectrum having a non-zero support on [0.5,1] Hz.

Here, γ indicates the fraction of the CSI power that is coming from static paths. Among the gain impairments, for the large-scale gain, $$g_p^{(1)}$$

may be used as a real Gaussian process with standard deviation 0.2 dB and a Doppler power spectrum with non-zero support on [0,0.1] Hz. For AGC gain, $$g_p^{(1)}\in\{-0.5,\,0,\,0.5\}\text{dB}$$

with probabilities of {0.2, 0.6, 0.2}, respectively may be used. For testing the performance of the gain error correction methods, an assumption is made that there are no phase-errors, or that there is ideal phase-error correction.

For quantifying the performance of the gain-correction algorithms, the correlation coefficient between $d_{p,k}$ and the dynamic component of processed CSI $\hat{h}_{p,k}$ may be defined as:

$$\chi=\frac{\left|\sum_{p\in\mathcal{P}}\sum_{k\in\mathcal{K}}(\hat{h}_{p,k}-\hat{b}_k)*d_{p,k}e^{j2\pi f_k\tau}\right|^2}{(1-\gamma)K|\mathcal{P}|\left(\sum_{p\in\mathcal{P}}\sum_{k\in\mathcal{K}}|\hat{h}_{p,k}-\hat{b}_k|^2\right)},$$

where $$\hat{b}_k\triangleq\Sigma_{p\in\mathcal{P}}\hat{h}_{p,k}/|\mathcal{P}|$$

is the static component of the cleaned CSI and:

$$\tau=\max_{\tau\in\mathbb{R}}\left|\sum_{k\in\mathcal{K}}b_k\hat{b}_k^*e^{j2\pi f_k\tau}\right|,$$

is the timing offset between the true CSI and cleaned CSI. Note that $\chi^2/(1-\chi^2)$ is representative of the SNR in estimating $d_{p,k}$ from the cleaned CSI $\hat{h}_{p,k}$.

The post-cleaning SNR for different gain-error correction embodiments under ideal phase-error compensation may be obtained and their computation times may be tabulated to determine performance of the various embodiments regarding gain-error correction.

Comparison of Phase-Error Correction Embodiments:

A comparison of the performance of the different algorithms described herein for phase-error correction using over 2000 realizations of simulated channels was performed. For the simulations, the following values were used: $T_{rep}$=100 ms, $\mathcal{P}$={0,1, . . . ,299} and $\mathcal{K}$={0,1, . . . ,255}. In each realization $h_{p,k}$ is generated as:

$$h_{p,k}=b_k+d_{p,k},$$

where $b_k$ is the static component of CSI that includes the line-of-sight path, reflected from static objects such as walls, etc., and $d_{p,k}$ is the dynamic component of CSI that is time varying and includes the variation to be sensed by the sensing algorithm. For the simulations, the static component $b_k$ may be generated using the 802.11ax Model-C channel model, and for the dynamic component the following cases may be considered:

i. $d_{p,k}$ is complex Gaussian distributed with variance 1−γ, i.e., $d_{p,k}\sim\mathcal{CN}(0,1-\gamma)$ and it is independent and identically distributed for each p∈ $\mathcal{P}$ and each k∈ $\mathcal{K}$.

ii. $d_{p,k}=\alpha_p e^{-j\pi f_k(\tau+\tau_0)}$, where τ~Uni[0,300) ns, $\tau_0$ is the delay of the line-of-sight path in $b_k$, and $\alpha_0$ is a complex Gaussian process of variance 1−γ with the Doppler power spectrum having a non-zero support on [0.5,1] Hz.

Here, γ indicates the fraction of the CSI power that is coming from static paths. Among the phase errors, $\tau_p$, $\psi_p$ may be modeled to be independent and identically distributed for each p∈ $\mathcal{P}$, with marginal distributions $\tau_p$~Uni[0, $10^{-7}$) seconds and up~Uni[−π, π). For testing the performance of the phase error correction methods, an assumption is made that there are no gain-errors, or that there is ideal gain-error correction.

For quantifying the performance of the phase-error correction algorithms, the correlation coefficient between $d_{p,k}$ and the dynamic component of processed CSI $\hat{h}_{p,k}$ may be defined as:

$$\chi=\frac{\left|\Sigma_{p\in\mathcal{P}}\Sigma_{k\in\mathcal{K}}(\hat{h}_{p,k}-\hat{b}_k)^*d_{p,k}e^{j2\pi f_k\tau}\right|^2}{(1-\gamma)K|\mathcal{P}|\left(\Sigma_{p\in\mathcal{P}}\Sigma_{k\in\mathcal{K}}|\hat{h}_{p,k}-\hat{b}_k|^2\right)},$$

where $$\hat{b}_k\triangleq\Sigma_{p\in\mathcal{P}}\hat{h}_{p,k}/|\mathcal{P}|$$

is static component of the cleaned CSI and:

$$\tau=\max_{\tau\in\mathbb{R}}\left|\sum_{k\in\mathcal{K}}b_k\hat{b}_k^*e^{j2\pi f_k\tau}\right|,$$

is the timing offset between the true CSI and cleaned CSI. Note that $\chi^2/(1-\chi^2)$ is representative of the SNR in estimating $d_{p,k}$ from the cleaned CSI $\hat{h}_{p,k}$.

The post-cleaning SNR for different phase-error correction embodiments under ideal gain-error compensation may be obtained and their computation times may be tabulated to determine performance of the various embodiments regarding phase-error correction.

Figure 12:
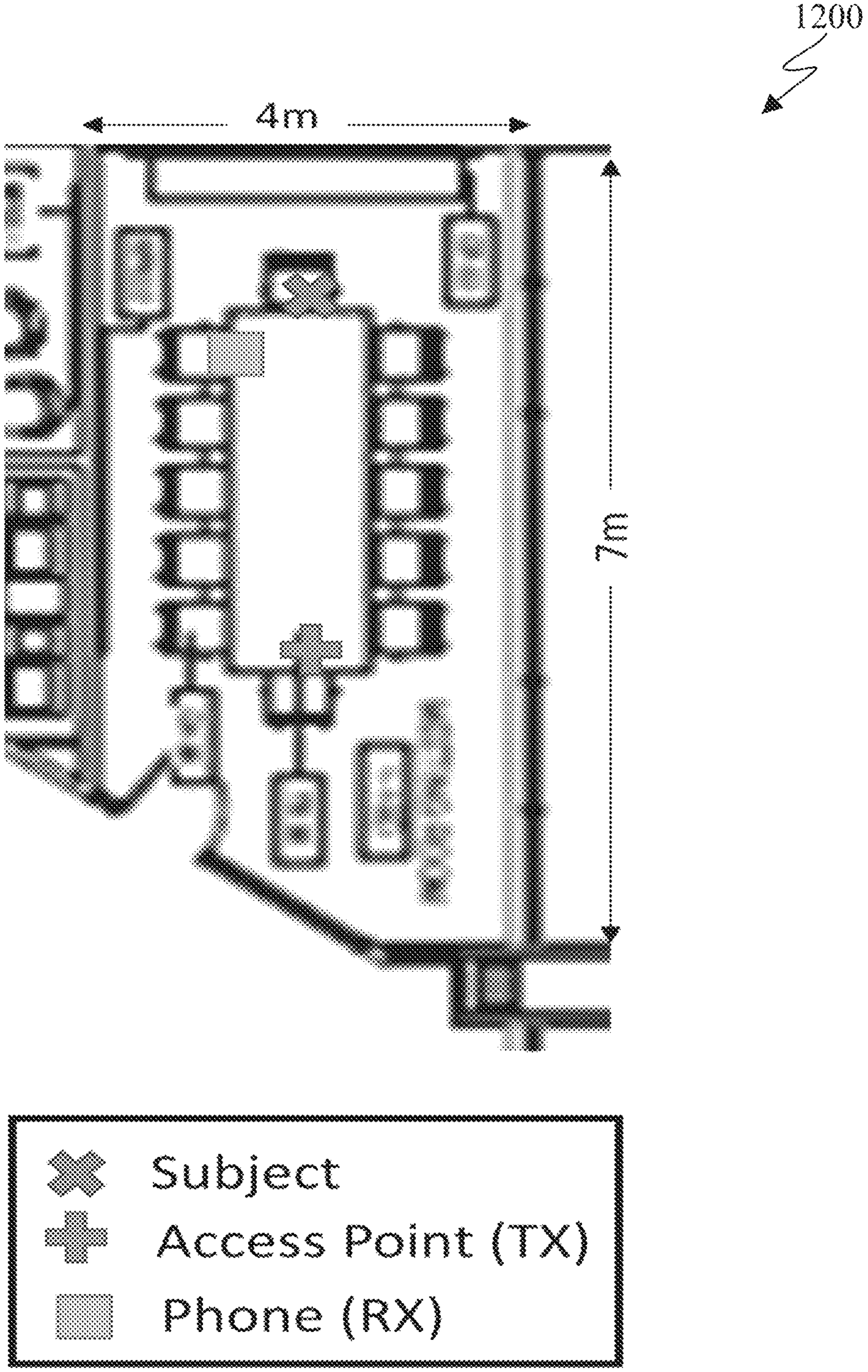
FIG. 12 illustrates an example setup used to determine performance of CSI preprocessing algorithms for respiration rate estimation according to various embodiments of the present disclosure.

Comparison of Gain and Phase-Error Correction Embodiments in Respiration Rate Estimation:

FIG. 12 illustrates an example setup 1200 used to determine performance of CSI preprocessing algorithms for respiration rate estimation according to various embodiments of the present disclosure. The embodiment of the example setup 1200 used to determine performance of CSI preprocessing algorithms for respiration rate estimation shown in FIG. 12 is for illustration only. Other embodiments of the example setup 1200 used to determine performance of CSI preprocessing algorithms for respiration rate estimation could be used without departing from the scope of this disclosure.

To validate the performance of the CSI preprocessing algorithms, testing them in a real-world sensing application of respiration rate monitoring was conducted. In this experiment, a stationary WiFi TX and RX were setup in a room along with a subject whose respiration rate was to be monitored. The dimensions of the room were 7 m×4 m, and an illustration of the setup is depicted in FIG. 12. The TX transmits WiFi packets on channel 155 of the 5 GHz ISM band with 20 MHz bandwidth and K=64 sub-carriers at intervals of $T_{rep}$=100 ms. In each measurement episode (i), P=500 CSI samples were collected (i.e., corresponding to a measurement time of 50 secs). In total, 100 such episodes were considered, spanning different configurations of TX, RX, and subject locations. In each episode, the obtained CSI $\{\tilde{h}_{p,k}|p\in\mathcal{P}, k\in\mathcal{K}\}$ may be preprocessed using one of the gain and phase correction methods described herein to obtain $\{\hat{h}_{p,k}|p\in\mathcal{P}, k\in\mathcal{K}\}$ and then the Doppler power spectrum may be estimated as:

$$h(v)=\sum_{k\in\mathcal{K}}\left|\sum_{p\in\mathcal{P}}\hat{h}_{p,k}e^{-j2\pi vpT_{rep}}\right|^2,$$

for v={0.1:0.02:0.5} Hz. For each episode (i), the estimation SNR may be computed as:

$$SNR(i)=\left(\sum_{|v-v_0|\le 0.02}h(v)\right)\bigg/\left(\sum_{|v-v_0|>0.02}h(v)\right)$$

where $v_0$ is the ground-truth respiration rate (in Hz) of the subject as measured with a force belt. The mean SNR across the 100 episodes for different combinations of gain and phase compensation methods was tabulated, and performance results were obtained for different gain correction embodiments.

In another alternative, the true channel can be modeled to have a dominant component that slowly updates with time:

$$h_{p,k}=b_{p,k}+d_{p,k}$$

where $b_{p,k}$ is the dominant component of the channel including the line-of-sight path, reflections from walls and other slowly moving objects.

Step 1: Identifying and Removing Outliers (1)

In this case, the step 1 of outlier removal described above can again be performed. However, there can also be an alternative embodiment, where the outliers can be identified by checking for each sample 0≤p<P, if the following equation is satisfied:

$$\sum_{k\in\mathcal{K}}\left(\frac{|\tilde{h}_{p,k}|}{\left[\sum_{l\in\mathcal{K}}|\tilde{h}_{p,l}|^2\right]^{\frac{1}{2}}}-\sum_{q=p-A}^{p+A}\frac{|\tilde{h}_{q,k}|}{(2A+1)\left[\sum_{l\in\mathcal{K}}|\tilde{h}_{q,l}|^2\right]^{\frac{1}{2}}}\right)^2>\text{Threshold}$$

where A is a system parameter that can be related to the coherence time of the dominant component $b_{p,k}$. For example, A=5/$T_{rep}$, assuming a 10 sec coherence time of $b_{p,k}$ can be used. If the above equation is satisfied, then the corresponding noisy CSI sample $\{\tilde{h}_{p,k}|k\in\mathcal{K}\}$ may be too corrupted. After identifying and removing such CSI samples, the remaining CSI samples may be represented by the set $\mathcal{P}\subseteq\{0,\ldots,P-1\}$.

Step 2: Estimating and Removing Gain Error

In this case, the step 2 of gain removal described above can again be performed to obtain $\{\bar{h}_{p,k}|p\in P, k\in\mathcal{K}\}$.

Step 2.5: Identifying and Removing High Variability Regions

In this alternative, an additional step of identifying high variability CSI frames may be performed, where the dominant channel component $b_{p,k}$ changes quickly over time (and correspondingly has a high Doppler). Note that such fast variations in the dominant component can cause a high interference and 'wash out' the sensing signal, thus preventing its estimation. Correspondingly, a mechanism to identify such high variability regions may also be provided.

In some embodiments, the high variability regions can be identified by checking whether the variance of the absolute value of the gain corrected CSI $\{\bar{h}_{p,k}|p\in\mathcal{P}, k\in\mathcal{K}\}$ compared to its moving average value is higher than a threshold. In other words, a CSI sample $p\in\mathcal{P}$, can be identified as a high variability sample if:

$$\sum_{k\in\mathcal{K}}\left(|\bar{h}_{p,k}|-\sum_{q=p-C}^{C}\frac{|\bar{h}_{p,k}|}{2C+1}\right)^2>\text{Threshold},$$

where C is a design parameter, for example C=5.

In another embodiment, p∈P can be identified as a high variance sample if:

$$\frac{\sum_{k\in\mathcal{K}}\sum_{q=1}^{p-1}\left(|\bar{h}_{p,k}|-\sum_{r=1}^{p-1}\frac{|\bar{h}_{r,k}|}{p-1}\right)^2+\sum_{k\in\mathcal{K}}\sum_{q=p}^{P}\left(|\bar{h}_{p,k}|-\sum_{r=p}^{P}\frac{|\bar{h}_{r,k}|}{P-p}\right)^2}{\sum_{k\in\mathcal{K}}\sum_{q=1}^{P}\left(|\bar{h}_{p,k}|-\sum_{r=1}^{P}\frac{|\bar{h}_{r,k}|}{P}\right)^2}<\text{Threshold}.$$

In yet another embodiment, the set of high variance samples can be computed using a dynamic programming algorithm similar to the algorithms for V-optimal histograms.

In some embodiments, the set of all such identified high variance samples may be represented by $\mathcal{P}_{bad}$. In one embodiment, such samples can be removed from the CSI set as $\mathcal{P}=\mathcal{P}\setminus\mathcal{P}_{bad}$, before performing further preprocessing. In another embodiment, for all samples in $p\in\mathcal{P}_{bad}$, the estimation of the dynamic component $\bar{b}_{p,k}$ can be performed differently from the samples in $p\in\mathcal{P}\setminus\mathcal{P}_{bad}$, as explained in Step 3. For example, the filter bandwidth to estimate $\bar{b}_{p,k}$ can be kept much larger for $p\in\mathcal{P}_{bad}$ than for $p\in\mathcal{P}\setminus\mathcal{P}_{bad}$.

Step 3: Estimating and Removing Phase Errors:

Along with the timing and phase errors $\hat{\tau}_p$, $\hat{\psi}_p$, an estimate of the dominant channel component $\{\bar{b}_{p,k}|p\in\mathcal{P}, k\in\mathcal{K}\}$ may be obtained so that the sensing signal can be estimated as:

$$\hat{h}_{p,k}=\bar{h}_{p,k}e^{j2\pi f_k\hat{\tau}_p}e^{j\hat{\psi}_p}\text{ and }\hat{d}_{p,k}=\hat{h}_{p,k}-\bar{b}_{p,k}.$$

Here the estimation of $b_{p,k}$ can be performed differently for $p\in\mathcal{P}_{bad}$ and for $p\in\mathcal{P}\setminus\mathcal{P}_{bad}$ (see Step 2.5 above). Several algorithms for such estimation are discussed below. In a specific use-case, the desired algorithm may be determined based on the requirements of the sensing task.

In some embodiments, it may be considered that the TX and RX have a strong line-of-sight path. In this case, an initial estimate of the line-of-sight component of the channel can be obtained first as $\bar{b}_{p,k}$. The timing and CPE errors can then be estimated via maximum-likelihood estimation as shown in the following algorithm:

---

Inputs: $\bar{h}_{p,k}$ for $p\in\mathcal{P}$, $k\in\mathcal{K}$.
For $p\in\mathcal{P}$ Compute $\bar{\tau}_p=\frac{T_s}{2\pi}\angle\left[\sum_{k=0}^{K-2}\bar{h}_{p,k}\bar{h}_{p,k}^*\right]$.

Compute $\bar{\psi}_p=-\angle\left[\sum_{k\in\mathcal{K}}\bar{h}_{p,k}e^{j2\pi f_k\bar{\tau}_p}\right]$.

endFor
For $k\in\mathcal{K}$

Compute $\bar{b}_{p,k}=\sum_{q=p-A}^{p+A}\bar{h}_{p,k}e^{j(2\pi f_k\bar{\tau}_p+\bar{\psi}_p)}/(2A+1)$.

// Here A is a design variable indicating the coherence time of the dominant channel component.
// Separate values of A can be used for $p\in\mathcal{P}_{bad}$ and $p\in\mathcal{P}\setminus\mathcal{P}_{bad}$ (see Step 2.5).
The value of A used for $p\in\mathcal{P}_{bad}$ can be much smaller than what is used for $p\in\mathcal{P}\setminus\mathcal{P}_{bad}$.
endFor
For $p\in\mathcal{P}$
$\hat{\psi}$ Compute $\hat{\tau}_p=\underset{|\tau|\le\kappa T_s/K}{\operatorname{argmax}}\left|\sum_{k\in\mathcal{K}}e^{-j2\pi f_k\tau}\bar{h}_{p,k}^*\bar{b}_{p,k}\right|$.

Compute $\hat{\psi}_p=\angle\left[\sum_{k\in\mathcal{K}}e^{-j2\pi f_k\hat{\tau}_p}\bar{h}_{p,k}^*\bar{b}_{p,k}\right]$.

endFor
Return $\hat{\tau}_p$, $\hat{\psi}_p$, $\{\bar{b}_{p,k}|k\in\mathcal{K}\}$ for each $p\in\bar{h}\ \mathcal{P}$.

---

In some embodiments, to reduce the complexity of search for ty in one or more embodiments described herein, a weighted least squares solution can be used. In addition, to reduce the noise and errors, the summation over subcarriers can be reduced to a smaller subcarrier set $\tilde{\mathcal{K}}$, as shown in the following algorithm:

---

Inputs: $\bar{h}_{p,k}$ for $p\in\mathcal{P}$, $k\in\mathcal{K}$.
For $p\in\mathcal{P}$ Compute $\bar{\tau}_p=\frac{T_s}{2\pi}\angle\left[\sum_{k=0}^{K-2}\bar{h}_{p,k}\bar{h}_{p,k}^*\right]$.

Compute $\bar{\psi}_p=-\angle\left[\sum_{k\in\mathcal{K}}\bar{h}_{p,k}e^{j2\pi f_k\bar{\tau}_p}\right]$.

endFor
For $k\in\mathcal{K}$

Compute $\bar{b}_{p,k}=\sum_{q=p-A}^{p+A}\bar{h}_{p,k}e^{j(2\pi f_k\bar{\tau}_p+\bar{\psi}_p)}/(2A+1)$.

// Here A is a design variable indicating the coherence time of the dominant channel component.
// Separate values of A can be used for $p\in\mathcal{P}_{bad}$ and $p\in\mathcal{P}\setminus\mathcal{P}_{bad}$ (see Step 2.5).
The value of A used for $p\in\mathcal{P}_{bad}$ can be much smaller than what is used for $p\in\mathcal{P}\setminus\mathcal{P}_{bad}$.
endFor Compute $\tilde{\mathcal{K}}=\left\{k\in\mathcal{K}\,\middle|\,\sum_{p\in\mathcal{P}}|\bar{b}_{p,k}|^2>0.1|\mathcal{P}|\right\}$ For $p\in\mathcal{P}$ Compute $\omega_{p,k}=\bar{h}_{p,k}^*\bar{b}_{p,k}e^{-j2\pi f_k\bar{\tau}_p}$
OR $\omega_{p,k}=\mathrm{LPF}\{\bar{h}_{p,k}^*\bar{b}_{p,k}e^{-j2\pi f_k\bar{\tau}_p}\}$ for $k\in\tilde{\mathcal{K}}$.

// Here LPF{. } is a low pass filter along the dimension k.

Compute $\hat{\tau}_p,\hat{\psi}_p=\underset{\tau\in\mathbb{R},\psi\in\mathbb{R}}{\operatorname{argmin}}\left\{\begin{array}{c}\sum_{k\in\tilde{\mathcal{K}}}\omega_{p,k}[2\pi f_k(\tau-\bar{\tau}_p)+\\ \psi-\mathcal{U}(\angle\omega_{p,k})]^2\end{array}\right\}$.

// Here$\mathcal{K}$ $\mathcal{U}$(. ) is a phase-unwrapping function that for each $k\in\tilde{\mathcal{K}}$ adds integer shifts of $2\pi$ to the argument to ensure that the phase-difference from previous sub-carrier in $k_1\in\tilde{\mathcal{K}}$ satisfies $\hat{\tau}|\angle\omega_{p,k}-\angle\omega_{p,k_1}|\le\pi$.
endFor
Return$\hat{\psi}$ $\hat{\tau}_p$, $\hat{\psi}_p$, $\{\bar{b}_{p,k}|k\in\mathcal{K}\}$ for each $p\in\mathcal{P}$.

---

In some embodiments, it may be assumed that the channel between the TX and RX can have multi-path and correspondingly a small coherence bandwidth. Correspondingly, unlike in one or more embodiments described herein, the estimate of the dominant component $\bar{b}_{p,k}$ may be refined after correcting each CSI sample as shown in the following algorithm:

---

Inputs: $\bar{h}_{p,k}$ for $p\in\mathcal{P}$, $k\in\mathcal{K}$.
For $p\in\mathcal{P}$ Compute $\bar{\tau}_p=\frac{T_s}{2\pi}\angle\left[\sum_{k=0}^{K-2}\bar{h}_{p,k}\bar{h}_{p,k}^*\right]$.

Compute $\bar{\psi}_p=-\angle\left[\sum_{k\in\mathcal{K}}\bar{h}_{p,k}e^{j2\pi f_k\bar{\tau}_p}\right]$.

endFor
For $k\in\mathcal{K}$

Compute $\bar{b}_{0,k}=\sum_{p=0}^{A}\bar{h}_{p,k}e^{j(2\pi f_k\bar{\tau}_p+\bar{\psi}_p)}/(A+1)$.

// Here A is a design variable indicating the coherence time of the dominant channel component.
endFor
For $p\in\mathcal{P}$ -continued

---

Compute $\hat{\tau}_p = \underset{|\tau| \le \kappa T_s/K}{\operatorname{argmax}} \left| \sum_{k \in \mathcal{K}} e^{-j2\pi f_k \tau} \bar{h}^*_{p,k} \bar{b}_k \right|$.

Compute $\hat{\psi}_p = \angle \left[ \sum_{k \in \mathcal{K}} e^{-j2\pi f_k \hat{\tau}_p} \bar{h}^*_{p,k} \bar{b}_k \right]$.

Compute $\hat{h}_{p,k} = \bar{h}_{p,k} e^{j2\pi f_k \hat{\tau}_p} e^{j\hat{\psi}_p}$.

Update $\bar{b}_{p+1,k} = \alpha \bar{b}_{p,k} + (1-\alpha)\hat{h}_{p,k}$.

// Here α is a design parameter related to maximum Doppler of dominant channel component, e.g., $\alpha = 1/(1 + 0.2\pi T_{rep})$.

// Separate values of α can be used for $P \in \mathcal{P}_{bad}$ and $p \in \mathcal{P} \setminus \mathcal{P}_{bad}$ (see Step 2.5).

The value of α used for $p \in \mathcal{P}_{bad}$ can be much smaller than what is used for $p \in \mathcal{P} \setminus \mathcal{P}_{bad}$.

endFor

Return $\hat{\tau}_p$, $\hat{\psi}_p$, $\{\bar{b}_{p,k} | k \in \mathcal{P}\}$ for each $p \in \mathcal{P}$.

---

In some embodiments, to reduce the complexity of search for $\hat{\tau}_p$ in one or more embodiments described herein, a weighted least squares solution can be used. In addition, to reduce the noise and errors, the summation over subcarriers can be reduced to a smaller subcarrier set $\bar{\mathcal{K}}$, as shown in the following algorithm:

---

Inputs: $\bar{h}_{p,k}$ for $p \in \mathcal{P}$, $k \in \mathcal{K}$.

For $p \in \mathcal{P}$

Compute $\bar{\tau}_p = \frac{T_s}{2\pi} \angle \left[ \sum_{k=0}^{K-2} \bar{h}_{p,k} \bar{h}^*_{p,k} \right]$.

Compute $\bar{\psi}_p = -\angle \left[ \sum_{k \in \mathcal{K}} \bar{h}_{p,k} e^{j2\pi f_k \bar{\tau}_p} \right]$.

endFor

For $k \in \mathcal{K}$

Compute $\bar{b}_{0,k} = \sum_{p=0}^{A} \bar{h}_{p,k} e^{j(2\pi f_k \bar{\tau}_p + \bar{\psi}_p)} / (A+1)$.

// Here A is a design variable indicating the coherence time of the dominant channel component.

endFor

Compute $\bar{\mathcal{K}} = \left\{ k \in \mathcal{K} \,\middle|\, \sum_{p \in \mathcal{P}} |\bar{b}_{p,k}|^2 > 0.1|\mathcal{P}| \right\}$ For $p \in \mathcal{P}$ Compute $\omega_{p,k} = \bar{h}^*_{p,k} \bar{b}_{p,k} e^{-j2\pi f_k \bar{\tau}_p}$ OR $\omega_{p,k} = \mathrm{LPF}\{\bar{h}^*_{p,k} \bar{b}_{p,k} e^{-j2\pi f_k \bar{\tau}_p}\}$ for $k \in \bar{\mathcal{K}}$.

// Here LPF{. } is a low pass filter along the dimension k.

Compute $\hat{\tau}_p, \hat{\psi}_p = \underset{\tau \in \mathbb{R}, \psi \in \mathbb{R}}{\operatorname{argmin}} \left\{ \sum_{k \in \bar{\mathcal{K}}} \omega_{p,k} [2\pi f_k (\tau - \bar{\tau}_p) + \psi - \mathcal{U}(\angle \omega_{p,k})]^2 \right\}$.

//Here $\mathcal{U}(.)$ is a phase-unwrapping function that for each $k \in \bar{\mathcal{K}}$ adds integer shifts of 2π to the argument to ensure that the phase-difference from previous sub-carrier in $k_1 \in \bar{\mathcal{K}}$ satisfies $|\angle\omega_{p,k} - \angle\omega_{p,k_1}| \le \pi$.

Compute $\hat{h}_{p,k} = \bar{h}_{p,k} e^{j2\pi f_k \hat{\tau}_p} e^{j\hat{\psi}_p}$.

Update $\bar{b}_{p+1,k} = \alpha \bar{b}_{p,k} + (1-\alpha)\hat{h}_{p,k}$.

//Here α is a design parameter related to maximum Doppler of dominant channel component, e.g., $\alpha = 1/(1 + 0.2\pi T_{rep})$.

// Separate values of α can be used for $p \in \mathcal{P}_{bad}$ and $p \in \mathcal{P} \setminus \mathcal{P}_{bad}$ (see Step 2.5).

The value of α used for $p \in \mathcal{P}_{bad}$ can be much smaller than what is used for $p \in \hat{\tau}\, \mathcal{P} \setminus \mathcal{P}_{bad}$.

endFor

Return $\hat{\tau}_p$, $\hat{\psi}_p$, $\{\bar{b}_{p,k} | k \in \mathcal{K}\}$ for each $p \in \mathcal{P}$.

---

In some embodiments, an additional backward pass for improving the estimation of $\hat{\tau}_p$, $\hat{\psi}_p$ from one or more embodiments described herein can be added for p<P/2. This is because CSI frames for p<P/2 may have insufficient history for accurate correction. This method can be performed as shown in the below algorithm:

---

Inputs: $\bar{h}_{p,k}$ for $p \in \mathcal{P}$, $k \in \mathcal{K}$.

Run algorithm in one or more embodiments described herein to obtain estimates of $\hat{\tau}_p$, $\hat{\psi}_p$, for each $p \in \mathcal{P}$.

For $p = \lfloor P/2 \rfloor : (-1) : 0$

Update $\bar{b}_{p,k} = \sum_{q=p-A}^{p+A} \bar{h}_{q,k} e^{j(2\pi f_k \hat{\tau}_q + \hat{\psi}_q)} / (2A+1)$.

// Separate values of A can be used for $p \in \mathcal{P}_{bad}$ and $p \in \mathcal{P} \setminus \mathcal{P}_{bad}$ (see Step 2.5).

The value of A used for $p \in \mathcal{P}_{bad}$ can be much smaller than what is used for $p \in \mathcal{P} \setminus \mathcal{P}_{bad}$.

$\hat{\tau}$ Compute $\hat{\tau}_p = \underset{|\tau| \le \kappa T_s/K}{\operatorname{argmax}} \left| \sum_{k \in \mathcal{K}} e^{-j2\pi f_k \tau} \bar{h}^*_{p,k} \bar{b}_{p,k} \right|$.

Compute $\hat{\psi}_p = \angle \left[ \sum_{k \in \mathcal{K}} e^{-j2\pi f_k \hat{\tau}_p} \bar{h}^*_{p,k} \bar{b}_{p,k} \right]$.

endFor

Return $\hat{\tau}_p$, $\hat{\psi}_p$, $\{\bar{b}_{p,k} | k \in \mathcal{K}\}$ for each $p \in \mathcal{P}$.

---

In some embodiments, an additional backward pass for improving the estimation of $\hat{\tau}_p$, $\hat{\psi}_p$ from one or more embodiments described herein can be added for p<P/2. This is because CSI frames for p<P/2 may have insufficient history for accurate correction. This method can be performed as shown in the below algorithm:

---

Inputs: $\bar{h}_{p,k}$ for $p \in \mathcal{P}$, $k \in \bar{b}\, \mathcal{K}$.

Run algorithm in one or more embodiments described herein to obtain estimates of $\bar{b}_k$, $\bar{\tau}_p$, $\hat{\tau}_p$, $\hat{\psi}_p$ for each $p \in \mathcal{P}$.

For $p = \lfloor P/2 \rfloor : (-1) : 0$

Update $\bar{b}_{p,k} = \alpha \bar{b}_{p+1,k} + (1-\alpha)\hat{h}_{p+1,k}$.

// Separate values of α can be used for $p \in \mathcal{P}_{bad}$ and $p \in \mathcal{P} \setminus \mathcal{P}_{bad}$ (see Step 2.5).

The value of α used for $p \in \mathcal{P}_{bad}$ can be much smaller than what is used for $p \in \mathcal{P} \setminus \mathcal{P}_{bad}$.

Compute $\omega_{p,k} = \bar{h}^*_{p,k} \bar{b}_{p,k} e^{-j2\pi f_k \bar{\tau}_p}$ OR $\omega_{p,k} = \mathrm{LPF}\{\bar{h}^*_{p,k} \bar{b}_{p,k} e^{-j2\pi f_k \bar{\tau}_p}\}$ for $k \in \bar{\mathcal{K}}$.

// Here LPF{. } is a low pass filter along the dimension k.

Compute $\hat{\tau}_p, \hat{\psi}_p = \underset{\tau \in \mathbb{R}, \psi \in \mathbb{R}}{\operatorname{argmin}} \left\{ \sum_{k \in \bar{\mathcal{K}}} \omega_{p,k} [2\pi f_k (\tau - \bar{\tau}_p) + \psi - \mathcal{U}(\angle \omega_{p,k})]^2 \right\}$.

//Here $\mathcal{U}(.)$ is a phase-unwrapping function that for each $k \in$ adds integer shifts of 2π to the argument to ensure that the phase-difference from previous sub-carrier in $k_1 \in \bar{X}$ satisfies:

$$|\angle\omega_{p,k} - \angle\omega_{p,k_1}| \le \pi$$

endFor

Return $\hat{\tau}_p$, $\hat{\psi}_p$, $\{\bar{b}_{p,k} | k \in \mathcal{K}\}$ for each $p \in \mathcal{P}$.

---

Figure 13:
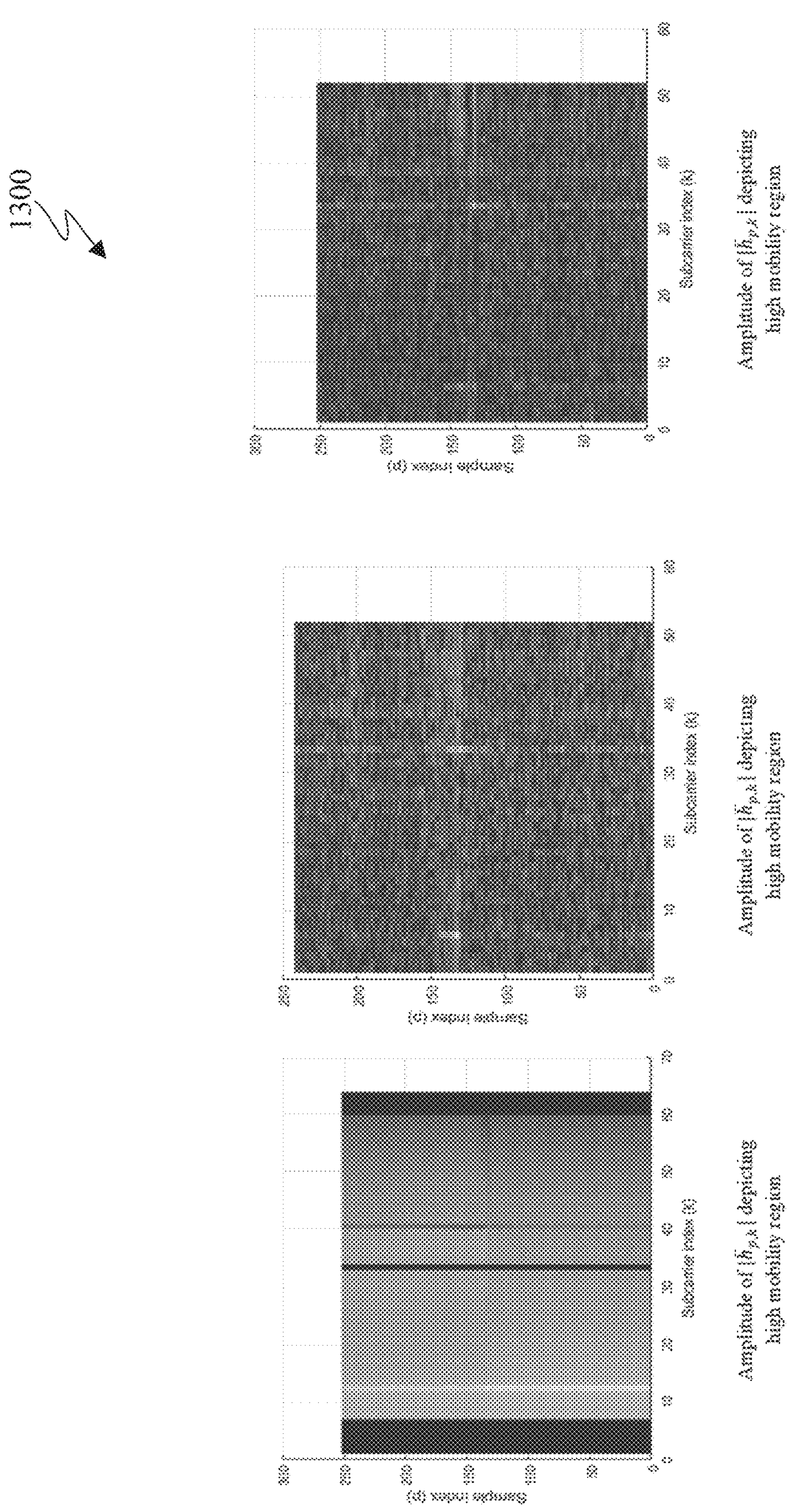
FIG. 13 illustrates an example of using different values of A or α in the phase-correction step for samples $p \in \mathcal{P}_{bad}$ according to various embodiments of the present disclosure.

An illustration of the impact of using different values of α or A (based on the embodiment of step 3) for $p \in \mathcal{P} \setminus \mathcal{P}_{bad}$ and $p \in \mathcal{P}_{bad}$ is depicted in FIG. 13. As shown in FIG. 13, the use of different values reduces the amount of interference in the cleaned CSI, thus enabling better sensing operation.

FIG. 13 illustrates an example of using different values of A or α in the phase-correction step for samples $p \in \mathcal{P}_{bad}$

1300 according to various embodiments of the present disclosure. The embodiment of the example of using different values of A or α in the phase-correction step for samples $p \in \mathcal{P}_{bad}$ 1300 shown in FIG. 13 is for illustration only. Other embodiments of the example of using different values of A or α in the phase-correction step for samples $p \in \mathcal{P}_{bad}$ 1300 could be used without departing from the scope of this disclosure.

In one variant of step 3 described above, instead of using a conventional phase unwrapping function $\mathcal{U}(\cdot)$, a robust phase unwrapping function may be used, defined as:

$$\tilde{\mathcal{U}}(\angle\omega_{p,k}) = \mathrm{mod}\left\{\angle\omega_{p,k} - \mathcal{U}\left(\sum_{\ell\in\mathcal{L}(k)}\omega_{p,\ell}\right) + \pi,\ 2\pi\right\} - \pi + \mathcal{U}\left(\sum_{\ell\in\mathcal{L}(k)}\omega_{p,\ell}\right),$$

where $\mathcal{L}$ (k) is a set that includes k and its 3 preceding and 3 succeeding indices in the sorted set $\bar{\mathcal{K}}$. Such a phase unwrapping may be more robust to impact the effects of channel noise than conventional phase unwrapping.

Step 4: Identifying and Removing Outliers (2):

Of the $\mathcal{P}$ corrected CSI samples, some may be too corrupted to be able to be used for the purpose of sensing. Accordingly, after step 3, an additional step can be performed to identify and remove such outliers. In some embodiments, the outliers can be identified by checking for each sample $p \in \mathcal{P}$, if the following equation is satisfied:

$$\sum_{k\in\mathcal{K}} \left(\hat{h}_{p,k} - \bar{b}_{p,k}\right)^2 > \text{Threshold}$$

If the above equation is satisfied, then the corresponding noisy CSI sample $\{\hat{h}_{p,k} | k \in \mathcal{K}\}$ may be too corrupted. After identifying and removing such CSI samples, the remaining CSI samples may be represented by the set $\mathcal{P}^* \subseteq \mathcal{P}$.

Finally, $\{\hat{h}_{p,k}, \bar{b}_{p,k} | p \in \mathcal{P}^*, k \in \mathcal{K}\}$ can be used as the corrected CSI parameters to use as input for the sensing algorithm/method.

Figure 14:
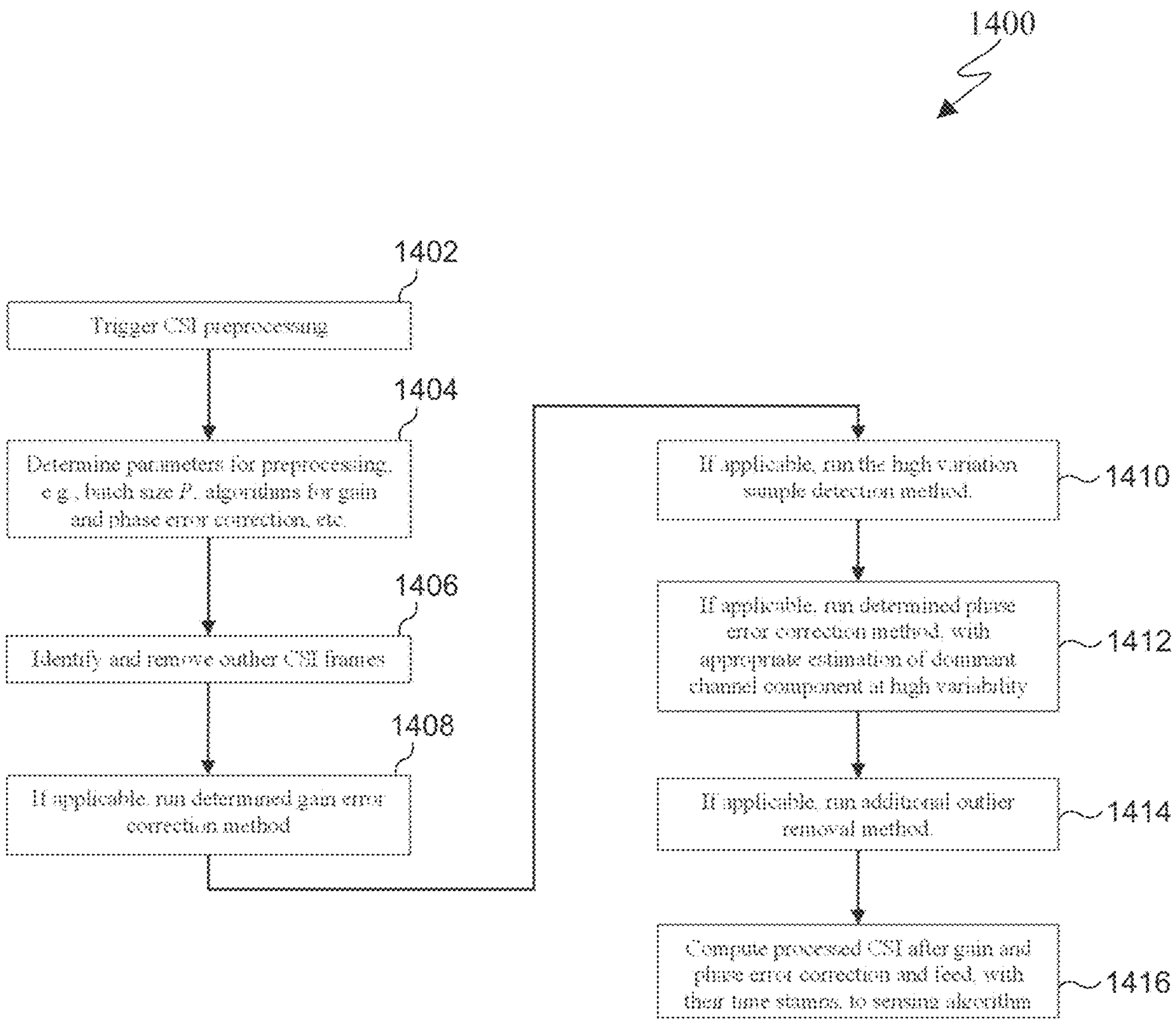
FIG. 14 illustrates an example flow diagram of an alternative embodiment for preprocessing WiFi CSI for supporting sensing applications according to various embodiments of the present disclosure.

FIG. 14 illustrates an example flow diagram 1400 of an alternative embodiment for preprocessing WiFi CSI for supporting sensing applications according to various embodiments of the present disclosure. The embodiment of the example flow diagram 1400 for preprocessing WiFi CSI for supporting sensing applications shown in FIG. 14 is for illustration only. Other embodiments of the example flow diagram 1400 for preprocessing WiFi CSI for supporting sensing applications could be used without departing from the scope of this disclosure.

As illustrated in FIG. 14, at step 1402, a trigger from a timer, external source or another algorithm is used to trigger the CSI preprocessing. At step 1404, the appropriate parameters for the CSI preprocessing are computed, including the batch size P, whether the gain correction and phase correction are required, the appropriate algorithms to use for gain and phase correction, etc. At step 1406, outlier detection and removal can be performed to remove the CSI samples that are too corrupted. At step 1408, the determined gain error estimation and correction method can be applied to obtain gain corrected CSI samples. At step 1410, the high variation sample detection method can be applied. At step 1412, the determined phase error correction method, with appropriate estimation of dominant channel component at high variability can be applied to the gain corrected CSI samples. At step 1414, an additional outlier removal step may be performed to remove some samples to identify a cleaned CSI set. At step 1416, the preprocessed CSI samples after gain and phase error correction can be computed, and fed, with their time stamps, to the appropriate sensing algorithm.

Figure 15:
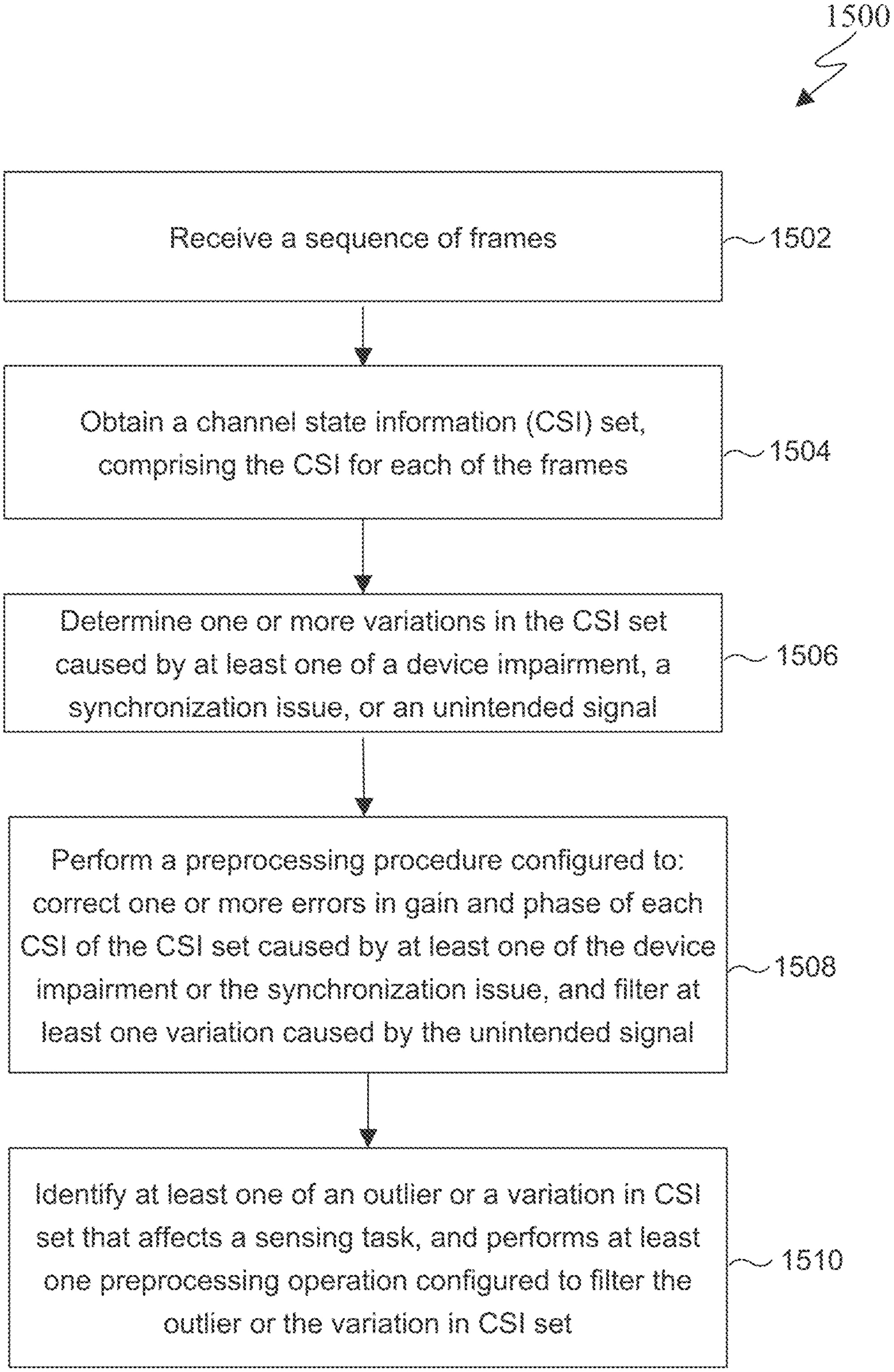
FIG. 15 illustrates an example of a method for wireless communication performed by a station device according to embodiments of the present disclosure.

FIG. 15 illustrates a flowchart of a method 1500 for wireless communication performed by a station device according to embodiments of the present disclosure. The example method 1500 shown in FIG. 15 is for illustration only. Other embodiments of the example method 1500 could be used without departing from the scope of this disclosure.

As illustrated in FIG. 15, the method 1500 begins at step 1502, where the STA receives a sequence of frames. At step 1504, the STA obtains a channel state information (CSI) set, comprising the CSI for each of the frames. At step 1506, the STA determines one or more variations in the CSI set caused by at least one of a device impairment, a synchronization issue, or an unintended signal. At step 1508, the STA performs a preprocessing procedure configured to: correct one or more errors in gain and phase of each CSI of the CSI set caused by at least one of the device impairment or the synchronization issue, and filter at least one variation caused by the unintended signal. At step 1510, the STA identifies at least one of an outlier or a variation in CSI set that affects a sensing task, and performs at least one preprocessing operation configured to filter the outlier or the variation in CSI set.

In one embodiment, the STA determines the one or more variations in each obtained CSI of the CSI set by estimating a gain error for the CSI, the gain error comprising a large-scale gain and an automatic gain control (AGC) gain.

In one embodiment, the gain error for each CSI of the CSI set is computed based on a power of the CSI in a logarithm-scale and statistics of the CSI set.

In one embodiment, the STA performs the preprocessing procedure by determining a gain corrected CSI set, each gain corrected CSI of the gain corrected CSI set being computed from each CSI of the CSI set and the corresponding estimated gain error.

In one embodiment, to determine one or more variations in the CSI set, the STA identifies if each CSI in the CSI set is a high variability CSI, the determination being based on if a deviation of a magnitude of a gain corrected CSI corresponding to the CSI from gain corrected CSIs corresponding to neighboring gain CSIs of the CSI set is higher than a threshold.

In one embodiment, to determine the one or more variations in each CSI of the CSI set, the STA estimates a phase error, wherein to estimate the phase error, the STA estimates a timing error associated with a frame reception time, and estimates a common phase error (CPE) associated with a difference in carrier phase between a transmitter of a frame and the STA.

In one embodiment, the estimation of the timing error and CPE for a CSI of the CSI set is performed chronologically, based on a comparison of a gain corrected CSI corresponding to the CSI to phase corrected CSIs corresponding to preceding CSIs in the CSI set.

In one embodiment, to perform the preprocessing operation, the STA determines a phase corrected CSI set, each phase corrected CSI of the phase corrected CSI set being computed from a gain corrected CSI, the estimated timing error, and the estimated CPE.

In one embodiment, to filter out an unintended signal, the STA subtracts a dominant channel component from each phase corrected CSI to obtain a non-dominant CSI, the dominant channel component for a CSI being determined by lowpass filtering a phase corrected CSI set based on whether the CSI is a high variability CSI.

In one embodiment, to identify the at least one of an outlier or a variation in CSI data, the STA identifies a change in a non-dominant CSI compared to its neighboring non-dominant CSI that exceeds a threshold.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of wireless communication performed by a station (STA), the method comprising:
- receiving a sequence of frames;
- obtaining a channel state information (CSI) set, comprising CSI for each of the frames;
- determining one or more variations in the CSI set caused by at least one of a device impairment, a synchronization issue, or an unintended signal;
- performing a preprocessing procedure configured to:
  - correct one or more errors in gain and phase of each CSI of the CSI set caused by at least one of the device impairment or the synchronization issue, and
  - filter at least one variation caused by the unintended signal; and
- identifying at least one of an outlier or a variation in the CSI set that affects a sensing task, and performing at least one preprocessing operation configured to filter the outlier or the variation in the CSI set.

2. The method of claim 1, wherein determining the one or more variations in each obtained CSI of the CSI set comprises estimating a gain error for the CSI, the gain error comprising a large-scale gain and an automatic gain control (AGC) gain.

3. The method of claim 2, where the gain error for each CSI of the CSI set is computed based on a power of the CSI in a logarithm-scale and statistics of the CSI set.

4. The method of claim 2, wherein performing the preprocessing procedure comprises determining a gain corrected CSI set, each gain corrected CSI of the gain corrected CSI set being computed from each CSI of the CSI set and the corresponding estimated gain error.

5. The method of claim 1, wherein determining one or more variations in the CSI set comprises identifying if each CSI in the CSI set is a high variability CSI, the determination being based on if a deviation of a magnitude of a gain corrected CSI corresponding to the CSI from gain corrected CSIs corresponding to neighboring gain CSIs of the CSI set is higher than a threshold.

6. The method of claim 1, wherein determining the one or more variations in each CSI of the CSI set comprises estimating a phase error, wherein estimating the phase error comprises:
- estimating a timing error associated with a frame reception time, and
- estimating a common phase error (CPE) associated with a difference in carrier phase between a transmitter of a frame and the STA.

7. The method of claim 6, wherein the estimation of the timing error and CPE for a CSI of the CSI set is performed chronologically, based on a comparison of a gain corrected CSI corresponding to the CSI to phase corrected CSIs corresponding to preceding CSIs in the CSI set.

8. The method of claim 6, wherein performing the preprocessing operation comprises determining a phase corrected CSI set, each phase corrected CSI of the phase corrected CSI set being computed from a gain corrected CSI, the estimated timing error, and the estimated CPE.

9. The method of claim 1, wherein filtering out an unintended signal comprises subtracting a dominant channel component from each phase corrected CSI to obtain a non-dominant CSI, the dominant channel component for a CSI being determined by lowpass filtering a phase corrected CSI set based on whether the CSI is a high variability CSI.

10. The method of claim 1, wherein identifying the at least one of an outlier or a variation in CSI data comprises identifying a change in a non-dominant CSI compared to its neighboring non-dominant CSI that exceeds a threshold.

11. A station (STA) comprising:
- a transceiver configured to:
  - receive a sequence of frames; and
  - obtain a channel state information (CSI) set, comprising CSI for each of the frames; and
- a processor coupled to the transceiver, the processor configured to:
  - determine one or more variations in the CSI set caused by at least one of a device impairment, a synchronization issue, or an unintended signal;
  - perform a preprocessing procedure configured to:
    - correct one or more errors in gain and phase of each CSI of the CSI set caused by at least one of the device impairment or the synchronization issue, and
    - filter at least one variation caused by the unintended signal; and
  - identify at least one of an outlier or a variation in the CSI set that affects a sensing task, and perform at least one preprocessing operation configured to filter the outlier or the variation in the CSI set.

12. The STA of claim 11, wherein to determine the one or more variations in each obtained CSI of the CSI set, the processor is configured to estimate a gain error for the CSI, the gain error comprising a large-scale gain and an automatic gain control (AGC) gain.

13. The STA of claim 12, where the gain error for each CSI of the CSI set is computed based on a power of the CSI in a logarithm-scale and statistics of the CSI set.

14. The STA of claim 12, wherein to perform the preprocessing procedure, the processor is configured to determine a gain corrected CSI set, each gain corrected CSI of the gain corrected CSI set being computed from each CSI of the CSI set and the corresponding estimated gain error.

15. The STA of claim 11, wherein to determine one or more variations in the CSI set, the processor is configured to identify if each CSI in the CSI set is a high variability CSI, the determination being based on if a deviation of a magnitude of a gain corrected CSI corresponding to the CSI from gain corrected CSIs corresponding to neighboring gain CSIs of the CSI set is higher than a threshold.

16. The STA of claim 11, wherein to determine the one or more variations in each CSI of the CSI set, the processor is configured to estimate a phase error, wherein to estimate the phase error, the processor is configured to:

estimate a timing error associated with a frame reception time, and estimate a common phase error (CPE) associated with a difference in carrier phase between a transmitter of a frame and the STA.

17. The STA of claim 16, wherein the estimation of the timing error and CPE for a CSI of the CSI set is performed chronologically, based on a comparison of a gain corrected CSI corresponding to the CSI to phase corrected CSIs corresponding to preceding CSIs in the CSI set.

18. The STA of claim 16, wherein to perform the preprocessing operation, the processor is configured to determine a phase corrected CSI set, each phase corrected CSI of the phase corrected CSI set being computed from a gain corrected CSI, the estimated timing error, and the estimated CPE.

19. The STA of claim 11, wherein to filter out an unintended signal, the processor is configured to subtract a dominant channel component from each phase corrected CSI to obtain a non-dominant CSI, the dominant channel component for a CSI being determined by lowpass filtering a phase corrected CSI set based on whether the CSI is a high variability CSI.

20. The STA of claim 11, wherein to identify the at least one of an outlier or a variation in CSI data, the processor is configured to identify a change in a non-dominant CSI compared to its neighboring non-dominant CSI that exceeds a threshold.

* * * * *